US011716721B2

(12) United States Patent
Huang et al.

(10) Patent No.: US 11,716,721 B2

(45) Date of Patent: Aug. 1, 2023

(54) SIGNALING AND REPORTING MULTI-BIT FEEDBACK PER TRANSPORT BLOCK

(71) Applicant: QUALCOMM Incorporated, San Diego, CA (US)

(72) Inventors: Yi Huang, San Diego, CA (US); Wanshi Chen, San Diego, CA (US); Peter Gaal, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 17/394,955

(22) Filed: Aug. 5, 2021

(65) Prior Publication Data

US 2023/0045454 A1 Feb. 9, 2023

(51) Int. Cl.

*H04W 72/1273* (2023.01)
*H04W 72/23* (2023.01)
*H04L 1/1867* (2023.01)
*H04W 24/08* (2009.01)

(52) U.S. Cl.

CPC ....... *H04W 72/1273* (2013.01); *H04L 1/1896* (2013.01); *H04W 24/08* (2013.01); *H04W 72/23* (2023.01)

(58) Field of Classification Search

None

See application file for complete search history.

(56) References Cited

U.S. PATENT DOCUMENTS 10,887,071 B2 * 1/2021 Peng .................... H04L 1/1861
2020/0059327 A1 * 2/2020 Kini ..................... H04L 1/1812

FOREIGN PATENT DOCUMENTS

WO WO-2018204491 A1 11/2018

OTHER PUBLICATIONS

International Search Report and Written Opinion—PCT/US2022/036920—ISA/EPO—dated Oct. 21, 2022.

NTT Docomo, et al., "HARQ-ACK Multiplexing", 3GPP TSG RAN WG1 NR Ad-Hoc#2, R1-1711116, 3rd Generation Partnership Project, Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, 3 Pages, Jun. 26, 2017, XP051300316, the whole document.

* cited by examiner

*Primary Examiner* — Hong S Cho

(74) *Attorney, Agent, or Firm* — Holland & Hart LLP

(57) ABSTRACT

Methods, systems, and devices for wireless communications are described. A user equipment (UE) may receive signaling that indicates whether feedback for each of one or more downlink messages scheduled to be received at the UE is to be single-bit feedback or multi-bit feedback. The UE may monitor for the one or more downlink messages. The UE may generate, based at least in part on the monitoring for the one or more downlink messages, a codebook for reporting the feedback pertaining to each downlink message, the codebook supporting inclusion of both single-bit feedback and multi-bit feedback based at least in part on the signaling. The UE may transmit a feedback message that is based at least in part on the codebook.

44 Claims, 21 Drawing Sheets

Grant 505

DL Message 510

| | Slot n-3 | Slot n-2 | Slot n-1 |
|---|---|---|---|
| CC1 | 1 Bit A/N Feedback | No Feedback | 1 Bit A/N Feedback |
| CC2 | 1 Bit A/N Feedback | 1 Bit Dummy Feedback | 1-Bit A/N Feedback |
| CC3 | Multi-Bit A/N Feedback | Multi-Bit A/N Feedback | No Feedback |
| CC4 | Multi-Bit Dummy Feedback | Multi-Bit A/N Feedback | Multi-Bit A/N Feedback |

Regular HARQ Subsubcodebook (CC1, CC2)

Turbo HARQ Subsubcodebook (CC3, CC4)

500

Grant 605

DL Message 610

| | Slot n-3 | Slot n-2 | Slot n-1 |
|---|---|---|---|
| CC1 | 1 Bit A/N Feedback | No Feedback | 1 Bit A/N Feedback |
| CC2 | 1 Bit A/N Feedback | 1 Bit Dummy Feedback | 1-Bit A/N Feedback |
| CC3 | Multi-Bit A/N Feedback | Multi-Bit A/N Feedback | No Feedback |
| CC4 | Multi-Bit Dummy Feedback | Multi-Bit A/N Feedback | Multi-Bit A/N Feedback |

Regular HARQ Subsubcodebook (CC1, CC2)

Turbo HARQ Subsubcodebook (CC3, CC4)

600

SIGNALING AND REPORTING MULTI-BIT FEEDBACK PER TRANSPORT BLOCK

FIELD OF TECHNOLOGY

The following relates to wireless communications, including signaling and reporting multi-bit feedback per transport block.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may transmit a feedback message in response to a downlink message. The feedback message may include a single bit of feedback per transport block (TB) or per code block group (CBG) in the downlink message. Alternatively, the feedback message may include multiple bits per TB or CBG. For example, the multi-bit feedback may indicate a one-bit acknowledgment (ACK) or negative acknowledgment (NACK) in addition to one or more bits to indicate additional information, for example, related to channel state information (CSI). Such multi-bit feedback (e.g., including ACK/NACK and additional information) may be referred to a turbo-HARQ or some other terminology. In some cases, feedback for multiple downlink messages may be transmitted via the same uplink resource, and the UE may generate a codebook corresponding to the multiple downlink messages. The UE may use the codebook to multiplex the feedback into a single uplink message. The UE may simultaneously support two codebooks that each correspond to one of a first or a second transmission reception point (TRP), or to high priority traffic or low priority traffic. However, current techniques do not support codebook structures for multiplexing multi-bit feedback with single-bit feedback.

SUMMARY

The described techniques relate to improved methods, systems, devices, and apparatuses that support signaling and reporting multi-bit feedback per transport block. Generally, the described techniques provide for different signaling techniques to indicate to a user equipment (UE) how a hybrid automatic repeat/request (HARQ) codebooks is to be generated. The UE may receive signaling indicating whether feedback (e.g., HARQ feedback) for downlink messages are to use single-bit and/or multi-bit feedback. The indication may be provided via radio resource control (RRC) signaling, the downlink control information (DCI) scheduling the downlink messages, various attributes associated with the physical downlink control channel (PDCCH) signal, and the like. Accordingly, the UE may monitor for the downlink messages and generate a codebook for reporting the feedback for each downlink message using the single-bit and/or multi-bit feedback. The UE may generate one subcodebook using single-bit feedback and another subcodebook using multi-bit feedback. The UE may concatenate the subcodebooks to generate the codebook and transmit a feedback message to the base station indicating the codebook. Accordingly, the UE may multiplex the single-bit and multi-bit feedback to the base station.

A method for wireless communication at a UE is described. The method may include receiving signaling that indicates whether feedback for each of one or more downlink messages scheduled to be received at the UE is to be single-bit feedback or multi-bit feedback, monitoring for the one or more downlink messages, generating, based on the monitoring for the one or more downlink messages, a codebook for reporting the feedback pertaining to each downlink message, the codebook supporting inclusion of both single-bit feedback and multi-bit feedback based on the signaling, and transmitting a feedback message that is based on the codebook.

An apparatus for wireless communication at a UE is described. The apparatus may include a processor, memory coupled with the processor, and instructions stored in the memory. The instructions may be executable by the processor to cause the apparatus to receive signaling that indicates whether feedback for each of one or more downlink messages scheduled to be received at the UE is to be single-bit feedback or multi-bit feedback, monitor for the one or more downlink messages, generate, based at least in part on the monitoring for the one or more downlink messages, a codebook for reporting the feedback pertaining to each downlink message, the codebook supporting inclusion of both single-bit feedback and multi-bit feedback based on the signaling, and transmit a feedback message that is based on the codebook.

Another apparatus for wireless communication at a UE is described. The apparatus may include means for receiving signaling that indicates whether feedback for each of one or more downlink messages scheduled to be received at the UE is to be single-bit feedback or multi-bit feedback, means for monitoring for the one or more downlink messages, means for generating, based on the monitoring for the one or more downlink messages, a codebook for reporting the feedback pertaining to each downlink message, the codebook supporting inclusion of both single-bit feedback and multi-bit feedback based on the signaling, and means for transmitting a feedback message that is based on the codebook.

A non-transitory computer-readable medium storing code for wireless communication at a UE is described. The code may include instructions executable by a processor to receive signaling that indicates whether feedback for each of one or more downlink messages scheduled to be received at the UE is to be single-bit feedback or multi-bit feedback, monitor for the one or more downlink messages, generate, based at least in part on the monitoring for the one or more downlink messages, a codebook for reporting the feedback pertaining to each downlink message, the codebook supporting inclusion of both single-bit feedback and multi-bit feedback based on the signaling, and transmit a feedback message that is based on the codebook.

Some examples of the method, apparatuses, and non-transitory computer-readable medium described herein may further include operations, features, means, or instructions for identifying, for each of the one or more downlink messages, a component carrier that the downlink message was received on, where the signaling indicates whether the feedback may be to be single-bit feedback or multi-bit feedback on a per-component carrier basis.

In some examples of the method, apparatuses, and non-transitory computer-readable medium described herein, the UE generates the codebook on a carrier-first then slot-second basis or on a slot-first then carrier-second basis.

In some examples of the method, apparatuses, and non-transitory computer-readable medium described herein, the multi-bit feedback includes one or more sets of multiple dummy bits in the codebook and each set of multiple dummy bits corresponds to a potential downlink message.

In some examples of the method, apparatuses, and non-transitory computer-readable medium described herein, generating, based on a first downlink assignment indicator (DAI) pair associated with a first component carrier, a first subsubcodebook associated with a first subset of the one or more downlink messages, the first subsubcodebook supporting inclusion of single-bit feedback, generating, based on a second DAI pair associated with a second component carrier, a second subsubcodebook associated with a second subset of the one or more downlink messages, the second subsubcodebook supporting inclusion of multi-bit feedback, and concatenating the first subsubcodebook and the second subsubcodebook to generate the codebook.

Some examples of the method, apparatuses, and non-transitory computer-readable medium described herein may further include operations, features, means, or instructions for generating a first subsubcodebook associated with a first subset of the one or more downlink messages whose feedback may be indicated as being single-bit feedback, generating a second subsubcodebook associated with a second subset of the one or more downlink messages whose feedback may be indicated as being multi-bit feedback, and concatenating the first subsubcodebook and the second subsubcodebook to generate the codebook.

Some examples of the method, apparatuses, and non-transitory computer-readable medium described herein may further include operations, features, means, or instructions for determining, based on the signaling, that at least one component carrier of a set of component carriers configured for the one or more downlink messages uses multi-bit feedback and generating the codebook using multi-bit feedback for each component carrier in the set of component carriers based on the at least one component carrier using multi-bit feedback.

Some examples of the method, apparatuses, and non-transitory computer-readable medium described herein may further include operations, features, means, or instructions for determining a control resource set identifier associated with a PDCCH message scheduling the one or more downlink messages, where the codebook may be generated to support single-bit feedback based on a first control resource set identifier and to support multi-bit feedback based on a second control resource set identifier.

In some examples of the method, apparatuses, and non-transitory computer-readable medium described herein, generating, for each monitoring occasion associated with the one or more downlink messages, a first subcodebook that supports inclusion of single-bit feedback, generating, for each monitoring occasion associated with the one or more downlink messages, a second subcodebook that supports inclusion of multi-bit feedback, and concatenating the first subcodebook and the second subcodebook to generate the codebook.

In some examples of the method, apparatuses, and non-transitory computer-readable medium described herein, generating, based on monitoring a first control resource set, a first subsubcodebook that supports inclusion of single-bit feedback for a first subset of downlink messages of the one or more downlink messages, generating, based on monitoring a second control resource set, a second subsubcodebook that supports inclusion of multi-bit feedback for a second subset of downlink messages of the one or more downlink messages, and concatenating the first subcodebook and the second subcodebook to generate the codebook.

Some examples of the method, apparatuses, and non-transitory computer-readable medium described herein may further include operations, features, means, or instructions for determining an identifier associated with a PDCCH message scheduling the one or more downlink messages, where the codebook may be generated to support single-bit feedback based on a first value of the identifier and to support multi-bit feedback based on a second value of the identifier.

Some examples of the method, apparatuses, and non-transitory computer-readable medium described herein may further include operations, features, means, or instructions for determining a format of a PDCCH message scheduling the one or more downlink messages, where the codebook may be generated to support single-bit feedback based on a first format of the PDCCH message and to support multi-bit feedback based on a second format of the PDCCH message.

Some examples of the method, apparatuses, and non-transitory computer-readable medium described herein may further include operations, features, means, or instructions for determining, for each monitoring occasion associated with the one or more downlink messages, whether the feedback may be to be single-bit feedback or multi-bit feedback based on a single bit indicated in a DCI scheduling the respective monitoring occasion.

A method for wireless communication at a base station is described. The method may include transmitting, to a UE, signaling that indicates whether feedback for each of one or more downlink messages scheduled to be received by the UE is to be single-bit feedback or multi-bit feedback, transmitting the one or more downlink messages to the UE, and receiving a feedback message from the UE responsive to the one or more downlink messages, the feedback message reporting the feedback pertaining to each downlink message based on a codebook generated by the UE, the codebook supporting inclusion of both single-bit feedback and multi-bit feedback based on the signaling.

An apparatus for wireless communication at a base station is described. The apparatus may include a processor, memory coupled with the processor, and instructions stored in the memory. The instructions may be executable by the processor to cause the apparatus to transmit, to a UE, signaling that indicates whether feedback for each of one or more downlink messages scheduled to be received by the UE is to be single-bit feedback or multi-bit feedback, transmit the one or more downlink messages to the UE, and receive a feedback message from the UE responsive to the one or more downlink messages, the feedback message reporting the feedback pertaining to each downlink message based on a codebook generated by the UE, the codebook supporting inclusion of both single-bit feedback and multi-bit feedback based on the signaling.

Another apparatus for wireless communication at a base station is described. The apparatus may include means for transmitting, to a UE, signaling that indicates whether feedback for each of one or more downlink messages scheduled to be received by the UE is to be single-bit feedback or multi-bit feedback, means for transmitting the one or more downlink messages to the UE, and means for receiving a feedback message from the UE responsive to the one or more downlink messages, the feedback message reporting the feedback pertaining to each downlink message based on a codebook generated by the UE, the codebook supporting inclusion of both single-bit feedback and multi-bit feedback based on the signaling.

A non-transitory computer-readable medium storing code for wireless communication at a base station is described. The code may include instructions executable by a processor to transmit, to a UE, signaling that indicates whether feedback for each of one or more downlink messages scheduled to be received by the UE is to be single-bit feedback or multi-bit feedback, transmit the one or more downlink messages to the UE, and receive a feedback message from the UE responsive to the one or more downlink messages, the feedback message reporting the feedback pertaining to each downlink message based on a codebook generated by the UE, the codebook supporting inclusion of both single-bit feedback and multi-bit feedback based on the signaling.

Some examples of the method, apparatuses, and non-transitory computer-readable medium described herein may further include operations, features, means, or instructions for identifying a set of component carriers associated with the one or more downlink messages and indicating, in the signaling, whether the feedback may be either single-bit feedback or multi-bit feedback on a per-component carrier basis.

In some examples of the method, apparatuses, and non-transitory computer-readable medium described herein, the codebook may be generated on a carrier-first then slot second basis or on a slot-first then carrier second basis.

In some examples of the method, apparatuses, and non-transitory computer-readable medium described herein, the multi-bit feedback includes one or more sets of dummy bits in the codebook.

In some examples of the method, apparatuses, and non-transitory computer-readable medium described herein, the signaling includes RRC signaling, a PDCCH message, a DCI grant associated with the one or more downlink messages, or a combination thereof.

In some examples of the method, apparatuses, and non-transitory computer-readable medium described herein, transmitting the signaling may include operations, features, means, or instructions for transmitting the signaling in different control resource sets, where the signaling that may be transmitted in a first control resource set may be indicative that the UE may be to generate a first subsubcodebook that supports inclusion of single-bit feedback for a first subset of downlink messages associated with the signaling that may be transmitted in the first control resource set, and where the signaling that may be transmitted in a second control resource set may be indicative that the UE may be to generate a second subsubcodebook that supports inclusion of multi-bit feedback for a second subset of downlink messages associated with the signaling that may be transmitted in the second control resource set, the first subset of downlink messages and the second subset of downlink messages being of the one or more downlink messages.

In some examples of the method, apparatuses, and non-transitory computer-readable medium described herein, transmitting the signaling may include operations, features, means, or instructions for including one or more identifiers in the signaling, where the codebook supports single-bit feedback based on a first value of the identifier and supports multi-bit feedback based on a second value of the identifier.

In some examples of the method, apparatuses, and non-transitory computer-readable medium described herein, transmitting the signaling may include operations, features, means, or instructions for transmitting the signaling using different formats of a PDCCH message scheduling the one or more downlink messages, where the codebook supports single-bit feedback based on a first format of the PDCCH message and supports multi-bit feedback based on a second format of the PDCCH message.

In some examples of the method, apparatuses, and non-transitory computer-readable medium described herein, transmitting the signaling may include operations, features, means, or instructions for including, in each DCI of the signaling, a one-bit indicator that indicates whether the codebook may be to support single-bit feedback or multi-bit feedback.

DETAILED DESCRIPTION

A user equipment (UE) may transmit a feedback message in response to a downlink message. The feedback message may include a single bit of feedback per transport block (TB) or per code block group (CBG) in the downlink message. Alternatively, the feedback message may include multiple bits per TB or CBG. For example, the multi-bit feedback may indicate a one-bit acknowledgment (ACK) or negative acknowledgment (NACK) in addition to one or more bits to indicate additional information, for example, related to channel state information (CSI). Such multi-bit feedback (e.g., including ACK/NACK and additional information) may be referred to a turbo-HARQ or some other terminology. In some cases, feedback for multiple downlink messages may be transmitted via the same uplink resource, and the UE may generate a codebook corresponding to the multiple downlink messages. The UE may use the codebook to multiplex the feedback into a single uplink message. The UE may simultaneously support two codebooks that each correspond to one of a first or a second transmission reception point (TRP), or to high priority traffic or low priority traffic. However, current techniques do not support codebook structures for multiplexing multi-bit feedback with single-bit feedback.

For example, the described techniques provide different signaling techniques to indicate to a UE how the HARQ codebooks is to be generated. The UE may receive signaling indicating whether feedback (e.g., HARQ feedback) for downlink messages are to use single-bit and/or multi-bit feedback. The indication may be provided via radio resource control (RRC) signaling, the downlink control information (DCI) scheduling the downlink messages, various attributes associated with the physical downlink control channel (PDCCH) signal, and the like. Accordingly, the UE may monitor for the downlink messages and generate a codebook for reporting the feedback for each downlink message using the single-bit and/or multi-bit feedback. The UE may generate one subcodebook using single-bit feedback and another subcodebook using multi-bit feedback. The UE may concatenate the subcodebooks to generate the codebook and transmit a feedback message to the base station indicating the codebook. Accordingly, the UE may multiplex the single-bit and multi-bit feedback to the base station.

Aspects of the disclosure are initially described in the context of wireless communications systems. Aspects of the disclosure are further illustrated by and described with reference to apparatus diagrams, system diagrams, and flowcharts that relate to signaling and reporting multi-bit feedback per TB.

Figure 1:
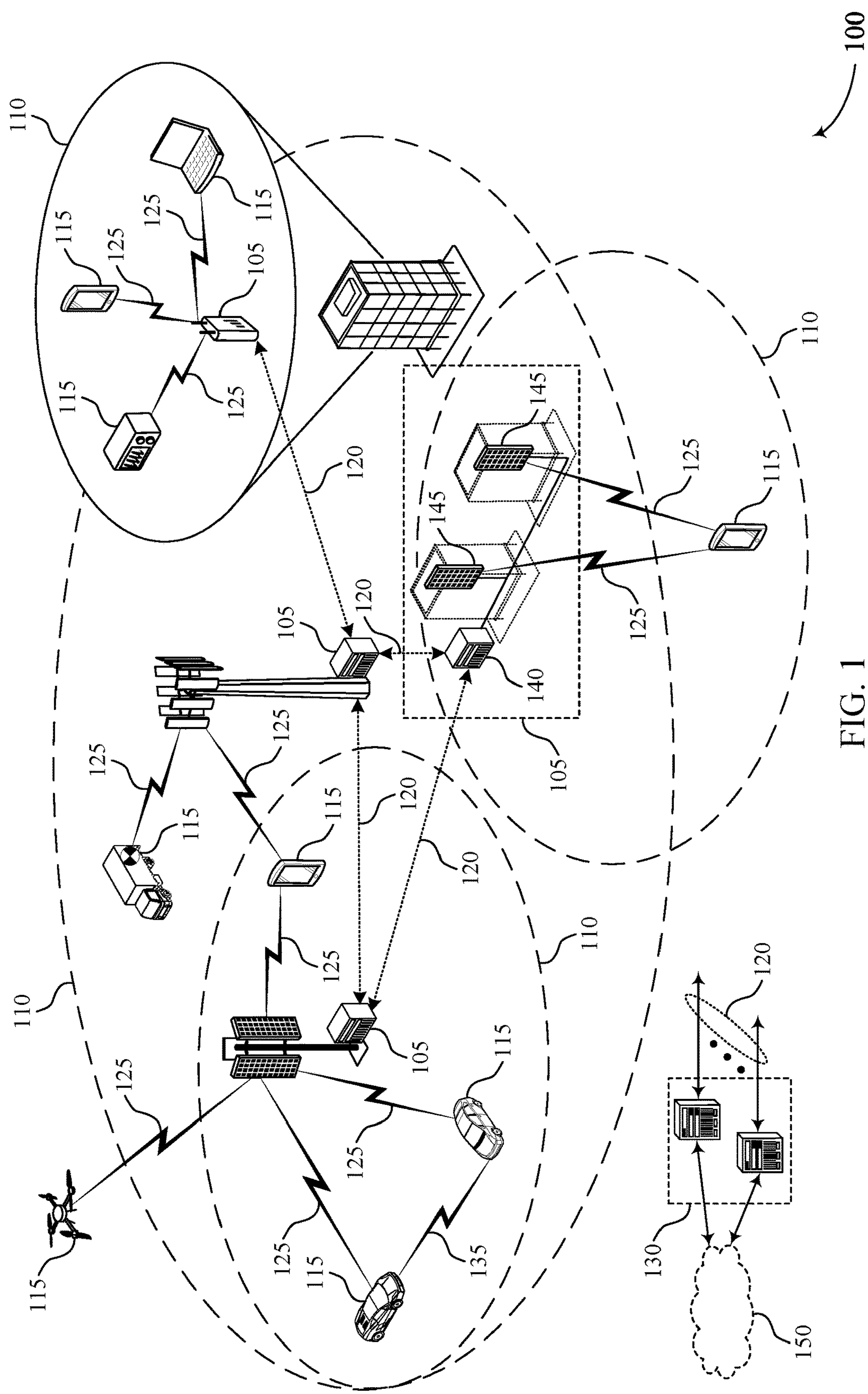
FIG. 1 illustrates an example of a wireless communication system that supports signaling and reporting multi-bit feedback per transport block (TB) in accordance with aspects of the present disclosure.

FIG. 1 illustrates an example of a wireless communications system 100 that supports signaling and reporting multi-bit feedback per TB in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier.

One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-todevice (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive signaling that indicates whether feedback for each of one or more downlink messages scheduled to be received at the UE 115 is to be single-bit feedback or multi-bit feedback. The UE 115 may monitor for the one or more downlink messages. The UE 115 may generate, based at least in part on the monitoring for the one or more downlink messages, a codebook for reporting the feedback pertaining to each downlink message, the codebook supporting inclusion of both single-bit feedback and multi-bit feedback based at least in part on the signaling. The UE 115 may transmit a feedback message that is based at least in part on the codebook.

A base station 105 may transmit, to a UE 115, signaling that indicates whether feedback for each of one or more downlink messages scheduled to be received by the UE 115 is to be single-bit feedback or multi-bit feedback. The base station 105 may transmit the one or more downlink messages to the UE 115. The base station 105 may receive a feedback message from the UE 115 responsive to the one or more downlink messages, the feedback message reporting the feedback pertaining to each downlink message based at least in part on a codebook generated by the UE 115, the codebook supporting inclusion of both single-bit feedback and multi-bit feedback based at least in part on the signaling.

Figure 2:
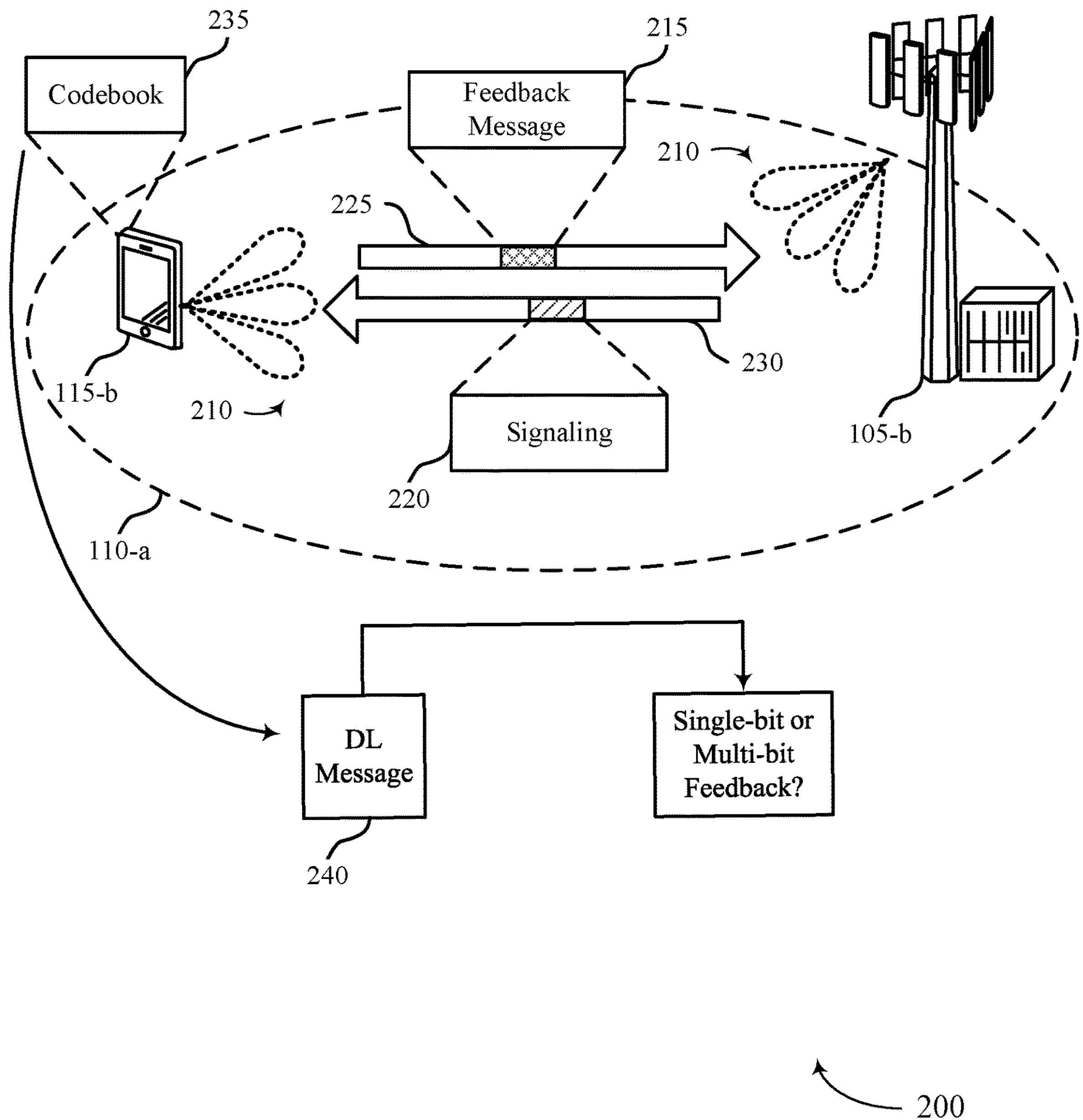
FIG. 2 illustrates an example of a wireless communication system that supports signaling and reporting multi-bit feedback per TB in accordance with aspects of the present disclosure.

FIG. 2 illustrates an example of a wireless communication system 200 that supports signaling and reporting multi-bit feedback per TB in accordance with aspects of the present disclosure. Wireless communication system 200 may implement aspects of wireless communication system 100. Wireless communication system 200 may include base station 105-*b* having a corresponding coverage area 110-*a* and UE 115-*b*, which may be examples of the corresponding devices described herein. In some aspects, base station 105-*b* and UE 115-*b* may wirelessly communicate with each other via non-beamform communications and/or beamformed communications (e.g., using beams 210).

As discussed above, a UE (such as UE 115-*b*) may transmit a feedback message 215 in response to a downlink message 240. The feedback message 215 may include a single bit of feedback per TB or per CBG for the downlink message. Alternatively, the feedback message may include multiple bits per TB or CBG. For example, the multi-bit feedback may indicate a one-bit ACK/NACK in addition to one or more bits to indicate additional information, for example, related to CSI. Such multi-bit feedback (e.g., including ACK/NACK and additional information) may be referred to a turbo-HARQ or some other terminology (such as multi-bit feedback). In some cases, feedback for multiple downlink messages may be transmitted via the same uplink resource, and the UE may generate a codebook 235 corresponding to the multiple downlink messages. The UE may use the codebook 235 to multiplex the feedback into a single uplink message. The UE may simultaneously support two codebooks that each correspond to one of a first or a second TRP, or to high priority traffic or low priority traffic. However, current techniques do not support codebook structures for multiplexing multi-bit feedback with single-bit feedback.

For example, this may include UE 115-*b* supporting one (e.g., a single) HARQ-ACK codebook. The codebook can be a type 1 codebook or type 2 codebook. Broadly, CBG vs TB based PDSCH may, at least in some aspects, use different HARQ-ACK subcodebooks. That is, the codebook may include two subcodebooks, with one subcodebook being for TB based PDSCH and the other subcodebook being for CBG based PDSCH. For a type 2 codebook, UE 115-*b* supporting simultaneous CBG and TB based PDSCH may use two downlink assignment indicator (DAI) pairs (e.g., a counter-DAI_CBG/total_DAI_CBG pair and a counter-_DAI_TB/total_DAI_TB pair). In some aspects, a single TB PDSCH vs two TB PDSCH (where the TB may also be referred to as a codeword (CW) in some examples) may use the same HARQ-ACK subcodebook and the same DAI pair (e.g., for a type 2 codebook). For the type 2 codebook, if an active CC is configured to support two TB, then the PDSCH on all active CCs may assume two-bit ACK/NACK feedback when constructing the HAR-ACK subcodebook. In some examples for the type 2 codebook, the one TB vs two TB PDSCH may use different subcodebooks and different DAI pairs. This may result in 2×2=4 subcodebooks and four independent DAIs pairs being used (e.g., to avoid complexity).

For UE 115-*b* to support certain traffic types (e.g., URLLC plus eMBB services), two HARQ-ACK codebooks may be used. One codebook may be associated with high priority (HP) traffic while the other codebook may be associated with low priority (LP) traffic. For UE 115-*b* to support multiple TRP-based traffic, again two codebooks may be used. One codebook for HARQ-ACK feedback for TRP1 and another codebook for HARQ-ACK feedback for TRP2. In some examples, supporting certain traffic types (e.g., URLLC plus eMBB) in addition to multiple TRPs may result in UE 115-*b* using four codebooks in its feedback. However, this may impose an increased processing/complexity burden on UE 115-*b* and/or base station 105-*b*, which may be undesirable. Accordingly, UE 115-*b* may simultaneously support up to two codebooks (comprising four subcodebooks, with each subcodebook comprising two sub-subcodebooks), where four independent DAI pairs are used for a type 2 codebook. Again, current techniques do not support codebook structures for multiplexing multi-bit feedback with single-bit feedback by UE 115-*b*.

For example, for each TB of a PDSCH (e.g., each TB of a downlink message) UE 115-*b* may feed back multiple bits in the feedback message 215 to provide additional information in addition to the one-bit ACK/NACK for the PDSCH. Examples of the additional information include, but are not limited to, the delta MCS for a TB received with an MCS index I_MCS. In some aspects, the delta MCS may be calculated from the difference between a target MCS (I_MCS_tgt) and the MCS used for the downlink transmission (I_MCS). Broadly, the target MCS (I_MCS_tgt) may correspond to the largest MCS index such that the estimated BLER for a TB received with a MCS index (I_MCS) would be smaller than or equal to a BLER target. Again, I_MCS may correspond to the MCS index of the received TB.

One example of how to extend the 1-bit feedback using two bits may include, but are not limited to, an ACK with the delta MCS+X (with respect to the MCS of the current PDSCH TB), where the X corresponds to an integer number indicating the change in the current MCS index to a target MCS index being X (e.g., from MCS index 4 to MCS index 6, where X would be two in this example). This may convey an indication that, although UE 115-*b* was able to successfully receive and decode the TB, the channel conditions are such that subsequent downlink messages would benefit from using a different MCS index. Another example may include an ACK with a delta MCS+0 (again with respect to the MCS of the current PDSCH TB). This may indicate that the channel conditions are such that no change to the current PDSCH TB MCS is needed. Another example may include a NACK with delta MCS−0. This may indicate that, although UE 115-*b* was not able to successfully receive and decode the TB, the channel conditions are such that no change to the current PDSCH TB MCS index is needed (e.g., in the situation where something other than the channel conditions caused UE 115-*b* to be unable to successfully receive and decode the downlink message). Yet another example may include a NACK with delta MCS-Y (also with respect to the current PDSCH TB). This may indicate that UE 115-*b* was unable to successfully receive and decode the downlink message, and therefore the channel conditions are such that a lower MCS index value (e.g., corresponding to Y) may be needed for subsequent downlink messages.

Accordingly, wireless communication system 200 may support CSI feedback/enhancements. This may include an increase in the number of bits used in the feedback for reported subband channel quality indicator (CQI) (e.g., such as a 3-bit differential subband CQI or 4-bit CQI). This may support and/or leverage turbo HARQ where the delta MCS is derived or otherwise determined based on PDSCH decoding. However, multiplexing single-bit (1-bit) and multi-bit HARQ-ACK feedback is not supported in some wireless communication systems.

Accordingly, aspects of the described techniques may support multiplexing single-bit (e.g., 1-bit) feedback with multi-bit feedback. This may result in a scenario where two codebooks are generated by UE 115-*b* (e.g., a HP HARQ-ACK codebook and a LP HARQ-ACK codebook, a TRP1 codebook and a TRP2 codebook). Each codebook may include two subcodebooks, such as a subcodebook for TB based PDSCH and another subcodebook for CBG based PDSCH (e.g., a set of subcodebooks for HP vs LP HARQ-ACK, a set of subcodebooks for TRP1 HARQ-ACK vs TRP2 HARQ-ACK, etc.). Each subcodebook may include two subsubcodebooks, such as a subsubcodebook for single-bit feedback and a subsubcodebook for multi-bit feedback. For a two-codebook configuration, this would include two codebooks, with each codebook being formed by concatenating two subcodebooks (e.g., per TB/CBG). Each subcodebook may be formed by concatenating two subsubcodebooks (e.g., single-bit vs multi-bit feedback).

That is, a first pair or set of subsubcodebooks may thereby correspond to multi-bit feedback per TB. A second pair or set of subsubcodebooks may correspond to multi-bit feedback per CBG, which may include multiple bits of feedback information per CBG or multiple bits of feedback information for each CBG in a TB. For example, UE 115-*b* may generate the feedback based on averaging all of the CBGs in the TB, based on a decoding performance of a CBG (e.g., a worst decoding performance), or both. A pair or set of subsubcodebooks may correspond to single-bit feedback per TB, where a different pair or set of subsubcodebooks may correspond to single-bit feedback per CBG.

Aspects of the described techniques provide various mechanisms to indicated, to UE 115-*b*, whether to generate single-bit feedback or multi-bit feedback for a TB (e.g., for downlink message 240). Broadly, this may include base station 105-*b* transmitting or otherwise conveying signaling 220 to UE 115-*b* that carries or otherwise conveys an indication of whether the HARQ-ACK feedback for each downlink message 240 scheduled for UE 115-*b* is single-bit feedback or multi-bit feedback. The signaling 220 may be transmitted or otherwise conveyed via a downlink communication link 230. The signaling 220 may provide an indication of how UE 115-*b* is to generate the codebook 235 conveyed in feedback message 215 via uplink communication link 225.

Base station 105-*b* may transmit or otherwise convey one or more downlink messages 240 to UE 115-*b* via downlink communication link 230. UE 115-*b* may monitor for the downlink messages 240 and generate a codebook 235 for reporting the feedback for each downlink message 240 according to the indication provided in the signaling 220. For example, the codebook 235 may include both single-bit feedback and multi-bit feedback (e.g., regular HARQ and Turbo HARQ).

At a high level, signaling 220 may carry or otherwise convey the indication via various options. One option may include signaling 220 being RRC signaling (e.g., using an RRC message) that provides the indication to UE 115-*b*. In some aspects, the RRC signaling may be used to configure or otherwise indicate to UE 115-*b* whether the feedback uses single-bit feedback or multi-bit feedback (e.g., regular HARQ vs Turbo HARQ) on a per CC basis. That is, the RRC signaling may configure various carriers used by UE 115-*b* for communications. The RRC signaling may identify which carriers (e.g., CCs) are configured for single-bit feedback and which carriers are configured for multi-bit feedback. Accordingly, UE 115-*b* receiving a downlink message 240 on a first carrier configured for single-bit feedback may generate the codebook using single-bit feedback (e.g., in a subcodebook and/or subsubcodebook). UE 115-*b* receiving a downlink message 240 on a second carrier configured for multi-bit feedback may generate the codebook using multi-bit feedback (e.g., in a subcodebook and/or subsubcodebook).

Another option may leverage certain attributes of PDCCH to carry or otherwise convey the indication. For example, the signaling 220 may be carrier in a PDCCH message (e.g., DCI or other DCI message). In some example, the PDCCH may be the scheduling PDCCH (e.g., the DCI scheduling downlink message 240 that is carried in the PDCCH). The attributes of PDCCH that may be used to carry or otherwise convey the indication may include, but are not limited to, which control resource set (CORESET) that the PDCCH is received in, the scrambling ID of the PDCCH, the PDCCH format (e.g., the format of the DCI scheduling the downlink message 240). Accordingly, a downlink message 240 scheduled by a PDCCH in a first CORESET, a PDCCH scrambled using a first scrambling ID, a first PDCCH format, and the like, may be indicated as using single-bit feedback or multi-bit feedback. Similarly, a downlink message 240 scheduled by a PDCCH in a second CORESET, a PDCCH scrambled using a second scrambling ID, a second PDCCH format, and the like, may be indicated as using multi-bit feedback or single-bit feedback.

Another option may leverage one (or more) bits in the DCI scheduling the PDSCH (e.g., downlink message 240) to indicate whether the feedback uses single-bit feedback or multi-bit feedback. For example, one (or more) bits in the DCI that schedules downlink message 240 may be used to carry or otherwise convey an indication of which feedback configuration is to be used for reporting HARQ-ACK feedback for the scheduled downlink message 240. In some examples, the bit(s) in the scheduling DCI may be used to override an RRC configured feedback configuration, e.g., base station 105-*b* may update the RRC indicated HARQ-ACK feedback reporting configuration using the bit(s) carried or otherwise conveyed in the scheduling DCI.

Accordingly, UE 115-*b* may monitor for the downlink messages 240 and generate the codebook for reporting the feedback pertaining to each downlink messages 240 that includes both single-bit feedback and multi-bit feedback. UE 115-*b* may transmit or otherwise provide feedback message 215 to base station 105-*b* via uplink communication link 225 that is based, at least to some degree, on the codebook. For example, UE 115-*b* may configure the feedback message 215 to include the codebook (e.g., an explicit indication) and/or to carry or otherwise convey information associated with the codebook (e.g., an implicit indication used by base station 105-*b* to determine the codebook).

Figure 3:
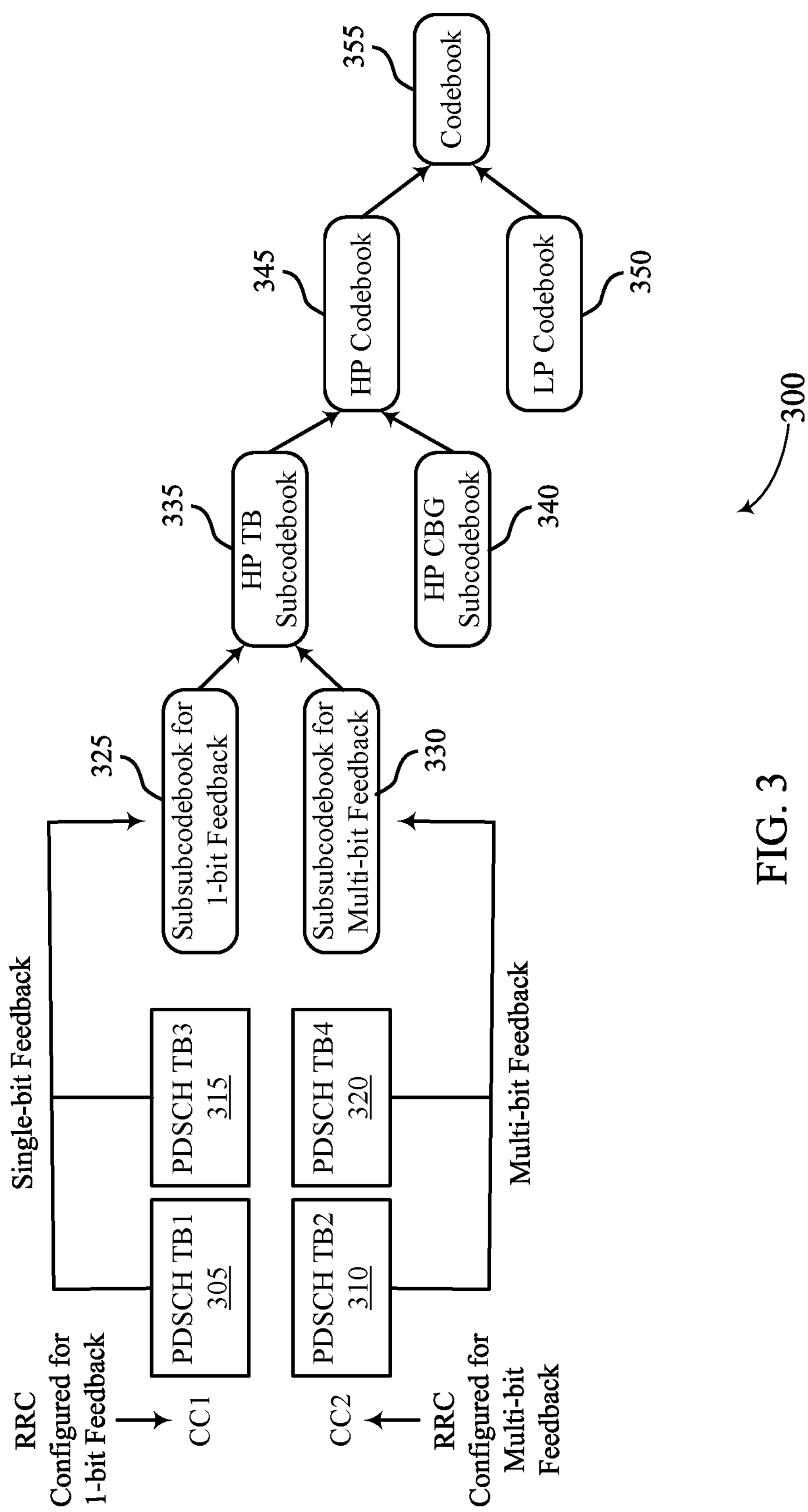
FIG. 3 illustrates an example of a feedback configuration that supports signaling and reporting multi-bit feedback per TB in accordance with aspects of the present disclosure.

FIG. 3 illustrates an example of a feedback configuration 300 that supports signaling and reporting multi-bit feedback per TB in accordance with aspects of the present disclosure. Feedback configuration 300 may implement aspects of wireless communication systems 100 and/or 200. Aspects of feedback configuration 300 may be implemented at and/or implemented by a UE and/or base station, which may be examples of the corresponding devices described herein.

As discussed above, aspects of the described techniques provide various mechanisms where the base station can signal to a UE an indication of whether feedback for downlink message(s) scheduled for the UE will use single-bit feedback or multi-bit feedback. The UE may monitor for the downlink message(s) transmitted from the base station and generate a codebook for reporting the feedback for each downlink message according to the indication. That is, the codebook may be generated according to the indication conveyed in the signaling using single-bit feedback and multi-bit feedback. The UE may transmit the feedback message to the base station that is based, at least in some aspects, on the codebook. That is, the UE may include the codebook in the feedback message and/or include information in the feedback message associated with the codebook.

Feedback configuration 300 shown in FIG. 3 illustrates a non-limiting example where the feedback reporting for regular vs Turbo HARQ (e.g., single-bit feedback vs multi-bit feedback) is indicated on a per-carrier (per-CC) basis. In this non-limiting example, the base station may transmit signaling to the UE indicating that a first carrier (e.g., CC1) is configured for single-bit feedback (e.g., regular HARQ) and that a second carrier (e.g., CC2) is configured for multi-bit feedback (e.g., Turbo HARQ). That is, the base station may use RRC signaling to configure whether each individual CC is to use single-bit feedback or multi-bit feedback. Accordingly, all PDSCHs (e.g., downlink messages) scheduled on a given CC may follow the RRC configuration for that CC (e.g., may use the single-bit or multi-bit feedback configured for that CC).

In the non-limiting example shown in FIG. 3, the base station may schedule a first downlink message 305 (e.g., PDSCH TB1) and a third downlink message 315 (e.g., PDSCH TB3) on the first carrier (e.g., CC1), a second downlink message 310 (e.g., PDSCH TB2) and a fourth downlink message 320 (e.g., PDSCH TB4) on the second carrier (e.g., CC2). Accordingly, the UE may monitor the first carrier and the second carrier to receive and decode the scheduled downlink messages. The UE may identify the CC that each downlink message was received on (e.g., based on the monitoring). As the signaling indicated that the feedback was configured on a per-CC basis, this may indicate to the UE that the codebook may be generated using single-bit feedback or multi-bit feedback on the per-CC basis. In this example, this may include that generating the codebook using single-bit feedback for downlink message(s) received on the first carrier and using multi-bit feedback for downlink message(s) received on the second carrier.

In the non-limiting example shown in FIG. 3, this may include the UE generating a first subsubcodebook 325 using single-bit feedback comprising one HARQ-ACK bit for each downlink message received on the first carrier (e.g., using one bit for PDSCH TB1 and one bit for PDSCH TB3). The UE may generate a second subsubcodebook 330 using multi-bit feedback comprising multiple HARQ-ACK bits (e.g., two or more bits) for each downlink message received on the second carrier (e.g., two bits for PDSCH TB2 and two bits for PDSCH TB4). The first subsubcodebook 325 and the second subsubcodebook 330 may be concatenated to form a first subcodebook 335 that is associated with high priority (HP) TB(s) transmitted to the UE. The UE may concatenate the first subcodebook 335 with a second subcodebook 340 that is associated with high priority (HP) CBG(s) transmitted to the UE to obtain a HP codebook 345 (e.g., a codebook associated with HP TB(s)/CBG(s). The UE may then concatenate the HP codebook 345 with a low priority (LP) codebook 350 associated with low priority TB(s)/CBG(s) transmitted to the UE. Finally, the UE may concatenate the HP codebook 345 with the LP codebook 350 to obtain the codebook 355. In some aspects, the UE may generate the codebook on a carrier-first then slot-second basis (e.g., includes bits for CC1 downlink messages first and then bits for CC2 downlink messages next) or on a slot-first then carrier-second basis (e.g., include bits for downlink messages received on CC1 and/or CC2 during a first slot first and then for downlink messages received on CC1 and/or CC2 during a second slot next).

The UE may transmit the feedback message to the base station that is based, at least in some aspects, on the codebook 355. That is, the UE may include the codebook 355 in the feedback message and/or may include information usable by the base station to identify or otherwise determine codebook 355.

Figure 4:
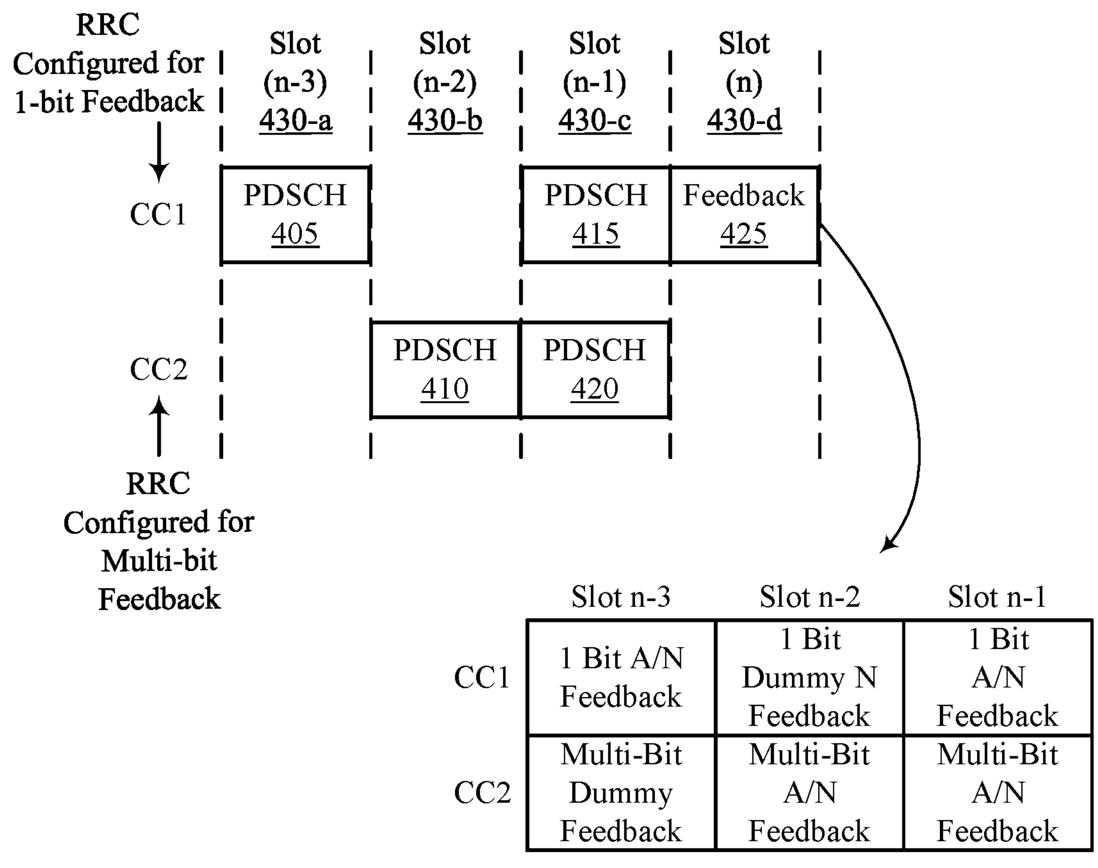
FIG. 4 illustrates an example of a feedback configuration that supports signaling and reporting multi-bit feedback per TB in accordance with aspects of the present disclosure.

FIG. 4 illustrates an example of a feedback configuration 400 that supports signaling and reporting multi-bit feedback per TB in accordance with aspects of the present disclosure. Feedback configuration 400 may implement aspects of wireless communication systems 100 and/or 200 and/or feedback configuration 300. Aspects of feedback configuration 400 may be implemented at and/or implemented by a UE and/or base station, which may be examples of the corresponding devices described herein. In some aspects, the codebook generated according to feedback configuration 400 may be an example of a type 1 codebook.

As discussed above, aspects of the described techniques provide various mechanisms where the base station can signal to a UE an indication of whether feedback for downlink message(s) scheduled for the UE will use single-bit feedback or multi-bit feedback. The UE may monitor for the downlink message(s) transmitted from the base station and generate a codebook for reporting the feedback for each downlink message according to the indication. That is, the codebook may be generated according to the indication conveyed in the signaling using single-bit feedback and multi-bit feedback. The UE may transmit the feedback message to the base station that is based, at least in some aspects, on the codebook. That is, the UE may include the codebook in the feedback message and/or include information in the feedback message associated with the codebook.

Feedback configuration 400 shown in FIG. 4 illustrates a non-limiting example where the feedback reporting for regular vs Turbo HARQ (e.g., single-bit feedback vs multi-bit feedback) is indicated on a per-carrier (per-CC) basis. In this non-limiting example, the base station may transmit signaling to the UE indicating that a first carrier (e.g., CC1) is configured for single-bit feedback (e.g., regular HARQ) and that a second carrier (e.g., CC2) is configured for multi-bit feedback (e.g., Turbo HARQ). That is, the base station may use RRC signaling to configure whether each individual CC is to use single-bit feedback or multi-bit feedback. Accordingly, all PDSCHs (e.g., downlink messages) scheduled on a given CC may follow the RRC configuration for that CC (e.g., may use the single-bit or multi-bit feedback configured for that CC).

In the non-limiting example shown in FIG. 4, the base station may schedule a first downlink message 405 (e.g., PDSCH) on CC1 during a slot 430-*a*, a second downlink message 410 on CC2 during slot 430-*b*, and a third downlink message 415 and a fourth downlink message 420 during slot 430-*c*. The uplink resources configured to provide feedback for the downlink messages are scheduled during slot 430-*d*. Accordingly, the UE may monitor the first carrier and the second carrier to receive and decode the scheduled downlink messages. The UE may identify the CC that each downlink message was received on (e.g., based on the monitoring). As the signaling indicated that the feedback was configured on a per-CC basis, this may indicate to the UE that the codebook may be generated using single-bit feedback or multi-bit feedback on the per-CC basis. In this example, this may include the UE generating the codebook using single-bit feedback for downlink message(s) received on the first carrier and using multi-bit feedback for downlink message (s) received on the second carrier.

In the non-limiting example shown in FIG. 4, this may include the UE generating a codebook that forms the basis for the feedback message 425. The example codebook illustrated in FIG. 4 includes one HARQ ACK/NACK (A/N) bit for the first downlink message 405 received during slot 430-*a*, one dummy bit HARQ feedback for CC1 to indicate that no downlink messages were received on CC1 during slot 430-*b*, and one HARQ ACK/NACK bit for the third downlink message 415, based on the RRC configuration signal configuring CC1 for single-bit feedback. The example codebook illustrated in FIG. 4 also includes multiple (e.g., two) dummy bits HARQ feedback to indicate that no downlink messages were received on CC2 during slot 430-*a*, multiple (e.g., two) HARQ ACK/NACK bits for the second downlink message 410 received during slot 430-*b*, and multiple HARQ ACK/NACK bits for the fourth downlink message 420 received during slot 430-*c*, based on the RRC configuration signal configuring CC2 for multiple-bit feedback. Accordingly, the multi-bit feedback may include one or more sets of multiple dummy bits in the codebook (e.g., dummy bits corresponding to potential downlink messages). As previously discussed, the UE may generate the codebook on a carrier-first then slot-second basis (e.g., includes bits for CC1 downlink messages first and then bits for CC2 downlink messages next) or on a slot-first then carrier-second basis (e.g., include bits for downlink messages received on CC1 and/or CC2 during a first slot first and then for downlink messages received on CC1 and/or CC2 during a second slot next).

Accordingly, on CCs configured with single-bit feedback, on PDSCH occasions with actual PDSCH receptions, the UE may send one bit real ACK/NACK feedback in the HARQ codebook. On PDSCH occasions without actual PDSCH receptions, the UE may send one dummy bit NACK indication. On CCs configured with multi-bit feedback (e.g., k-bits feedback), on PDSCH occasions with actual PDSCH receptions, the UE may send multi-bit HARQ ACK/NACK feedback in the HARQ-ACK codebook. During PDSCH occasions without actual PDSCH receptions, the UE may send multi-bit dummy HARQ feedback in the HARQ codebook. The feedback bits may then be concatenated following an ordering of CC first, slot second or an ordering of slot first, CC second) to build the subsubcodebook. The subsubcodebooks may then be concatenated together to form the subcodebooks, which may then be concatenated to form the codebook.

The UE may transmit the feedback message 425 to the base station that is based, at least in some aspects, on the codebook. That is, the UE may include the codebook in the feedback message 425 and/or may include information usable by the base station to identify or otherwise determine codebook.

Figure 5:
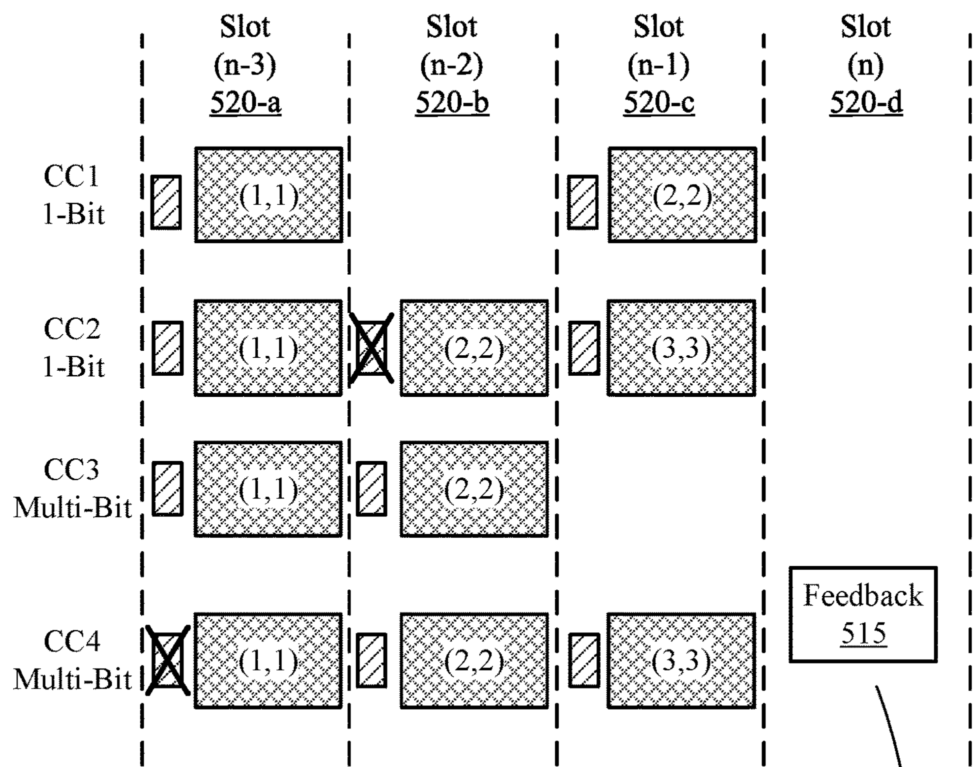
FIG. 5 illustrates an example of a feedback configuration that supports signaling and reporting multi-bit feedback per TB in accordance with aspects of the present disclosure.

FIG. 5 illustrates an example of a feedback configuration 500 that supports signaling and reporting multi-bit feedback per TB in accordance with aspects of the present disclosure. Feedback configuration 500 may implement aspects of wireless communication systems 100 and/or 200 and/or feedback configurations 300 and/or 400. Aspects of feedback configuration 500 may be implemented at and/or implemented by a UE and/or base station, which may be examples of the corresponding devices described herein. In some aspects, the codebook generated according to feedback configuration 500 may be an example of a type 2 codebook.

As discussed above, aspects of the described techniques provide various mechanisms where the base station can signal to a UE an indication of whether feedback for downlink message(s) scheduled for the UE will use single-bit feedback or multi-bit feedback. The UE may monitor for the downlink message(s) transmitted from the base station and generate a codebook for reporting the feedback for each downlink message according to the indication. That is, the codebook may be generated according to the indication conveyed in the signaling using single-bit feedback and multi-bit feedback. The UE may transmit the feedback message to the base station that is based, at least in some aspects, on the codebook. That is, the UE may include the codebook in the feedback message and/or include information in the feedback message associated with the codebook.

Feedback configuration 500 shown in FIG. 5 illustrates a non-limiting example where the feedback reporting for regular vs Turbo HARQ (e.g., single-bit feedback vs multi-bit feedback) is indicated on a per-carrier (per-CC) basis. In this non-limiting example, the base station may transmit signaling to the UE indicating that a first carrier (e.g., CC1) and a second carrier (e.g., CC2) are configured for single-bit feedback (e.g., regular HARQ) and that a third carrier (e.g., CC3) and a fourth carrier (e.g., CC4) are configured for multi-bit feedback (e.g., Turbo HARQ). In some examples, each or some carrier(s) of the CC1-CC4 carriers may be associated with the same cell or with other cells. That is, the base station may use RRC signaling to configure whether each individual CC is to use single-bit feedback or multi-bit feedback. Accordingly, all PDSCHs (e.g., downlink messages) scheduled on a given CC may follow the RRC configuration for that CC (e.g., may use the single-bit or multi-bit feedback configured for that CC).

In the non-limiting example shown in FIG. 5, each CC may be associated with a DAI pair (e.g., DAI-per-CC). Accordingly, the UE may run a DAI procedure on a per-CC basis to build the HARQ-ACK feedback codebook. The feedback from CCs with regular HARQ (e.g., single-bit feedback) may be concatenated to build a regular HARQ subsubcodebook. The feedback from CCs with Turbo HARQ (e.g., multi-bit feedback) may be concatenated to build the turbo HARQ subsubcodebook. The two subsubcodebooks may then be concatenated to build a TB or CBG based subcodebook, which may then be included in the feedback message (at least in some aspects).

In the non-limiting example shown in FIG. 5, the base station may transmit grants 505 on CC1-CC4 during PDCCH monitoring occasions of slot 520-*a* that schedules a corresponding downlink message 510 on CC1-CC4 during slot 520-*a*, with the downlink messages 510 corresponding to a DAI pair indicating 1,1 (e.g., as indicated in the corresponding grants 505). However, the UE may miss (e.g., be unable to receive and decode) the grant 505 scheduling the downlink message 510 on CC4 during slot 520-*a*. Accordingly and for the downlink messages 510 scheduled on CC1-CC2 during slot 520-*a*, the UE may generate one actual HARQ ACK/NACK bit (e.g., single-bit feedback) for the downlink messages 510 scheduled on CC1 and CC2.

The UE may generate multiple actual HARQ ACK/NACK bits (e.g., multi-bit feedback) for the downlink message 510 scheduled on CC3 during slot 520-*a*. For the downlink message 510 scheduled on CC4 during slot 520-*a*, the UE may generate multiple dummy HARQ bits (e.g., multi-bit feedback) due to the UE not receiving the grant 505 scheduling that downlink message 510 during slot 520-*a*. That is, the UE may subsequently receive the grant 505 scheduling the downlink message 510 during slot 520-*b* on CC4. Based on the DAI pair of 2,2 indicated in that grant, this may signal to the UE that it missed the downlink message 510 scheduled on CC4 during slot 520-*a* with DAI pair 1,1. The UE may insert the multiple dummy bits into the subsubcodebook based on the DAI pair indicating the missed downlink message 510 during slot 520-*a*.

During slot 520-*b*, the base station may transmit grants 505 on CC2-CC4 during PDCCH monitoring occasions of slot 520-*b* that schedules a corresponding downlink message 510 on CC2-CC4 during slot 520-*b*, with the downlink messages 510 corresponding to a DAI pair indicating 2,2 (e.g., as indicated in the corresponding grants 505). No downlink message 510 is scheduled on CC1 during slot 520-*b*. However, the UE may miss (e.g., be unable to receive and decode) the grant 505 scheduling the downlink message 510 on CC2 during slot 520-*b*. Accordingly and for absence of a downlink messages 510 scheduled on CC1 the UE may insert no bits in the subsubcodebook for CC1. For the downlink message 510 scheduled on CC2 during slot 520-*b*, the UE may generate one dummy HARQ bit (e.g., single-bit feedback) for the downlink messages 510 scheduled on CC2 during slot 520-*b*. That is, the UE may subsequently receive the grant 505 scheduling the downlink message 510 during slot 520-*c* on CC2. Based on the DAI pair of 3,3 indicated in that grant, this may signal to the UE that it missed the downlink message 510 scheduled on CC2 during slot 520-*b* with DAI pair 2,2 (e.g., there is a gap in the DAI pair). The UE may insert the one dummy bit into the subsubcodebook based on the DAI pair indicating the missed downlink message 510 during slot 520-*b*. The UE may generate multiple actual HARQ ACK/NACK bits (e.g., multi-bit feedback) for the downlink messages 510 scheduled on CC3-CC4 during slot 520-*b* for the Turbo HARQ subsubcodebook (e.g., based on CC3 and CC4 being configured for multi-bit feedback).

During slot 520-*c*, the base station may transmit grants 505 on CC1, CC2, and CC4 during PDCCH monitoring occasions of slot 520-*c* that schedules a corresponding downlink message 510 on CC1, CC2, and CC4 during slot 520-*c*, with the downlink messages 510 corresponding to a DAI pair indicating 2,2 (e.g., as indicated in the corresponding grant 505) for CC1 and indicating 3,3 (as indicated in the corresponding grants 505) for CC2 and CC4. No downlink message 510 is scheduled on CC3 during slot 520-*c*. Accordingly and for the absence of a downlink messages 510 scheduled on CC3 the UE may insert no bits in the subsubcodebook for CC3. For the downlink messages 510 scheduled on CC1 and CC2 during slot 520-*c*, the UE may generate one actual HARQ ACK/NACK bit (e.g., single-bit feedback) for the downlink messages 510 scheduled on CC1 and CC2 during slot 520-*c*. The UE may generate multiple actual HARQ ACK/NACK bits (e.g., multi-bit feedback) for the downlink message 510 scheduled on CC4 during slot 520-*c* for the Turbo HARQ subsubcodebook (e.g., based on CC4 being configured for multi-bit feedback).

Accordingly, the UE may generate, based on the DAI pairs associated with the CC1-CC2, a subsubcodebook associated with a subset of the downlink messages 510 (e.g., the downlink messages scheduled on CC1-CC2), which have been configured for single-bit feedback. The UE may generate, based on the DAI pairs associated with the CC3-CC4, a subsubcodebook associated with a subset of the downlink messages 510 (e.g., the downlink messages scheduled on CC3-CC4), which have been configured for multi-bit feedback. The UE may concatenate the subsubcodebooks when generating the codebook.

Accordingly, on CCs configured with single-bit feedback, on PDSCH occasions with actual PDSCH receptions, the UE may send one bit real ACK/NACK feedback in the HARQ codebook. On PDSCH occasions with missed PDSCH receptions, the UE may send one dummy bit NACK indication. On CCs configured with multi-bit feedback (e.g., k-bits feedback), on PDSCH occasions with actual PDSCH receptions, the UE may send multi-bit HARQ ACK/NACK feedback in the HARQ-ACK codebook. During PDSCH occasions with missed PDSCH receptions, the UE may send multi-bit dummy HARQ feedback in the HARQ codebook. On PDSCH occasions with no scheduled PDSCH receptions, the UE may send no bits. The feedback bits may then be concatenated following an ordering of CC first, slot second or an ordering of slot first, CC second to build the subsubcodebook. The subsubcodebooks may then be concatenated together to form the subcodebooks, which may then be concatenated to form the codebook.

The UE may transmit the feedback message 515 to the base station that is based, at least in some aspects, on the codebook. That is, the UE may include the codebook in the feedback message 515 and/or may include information usable by the base station to identify or otherwise determine codebook.

Figure 6:
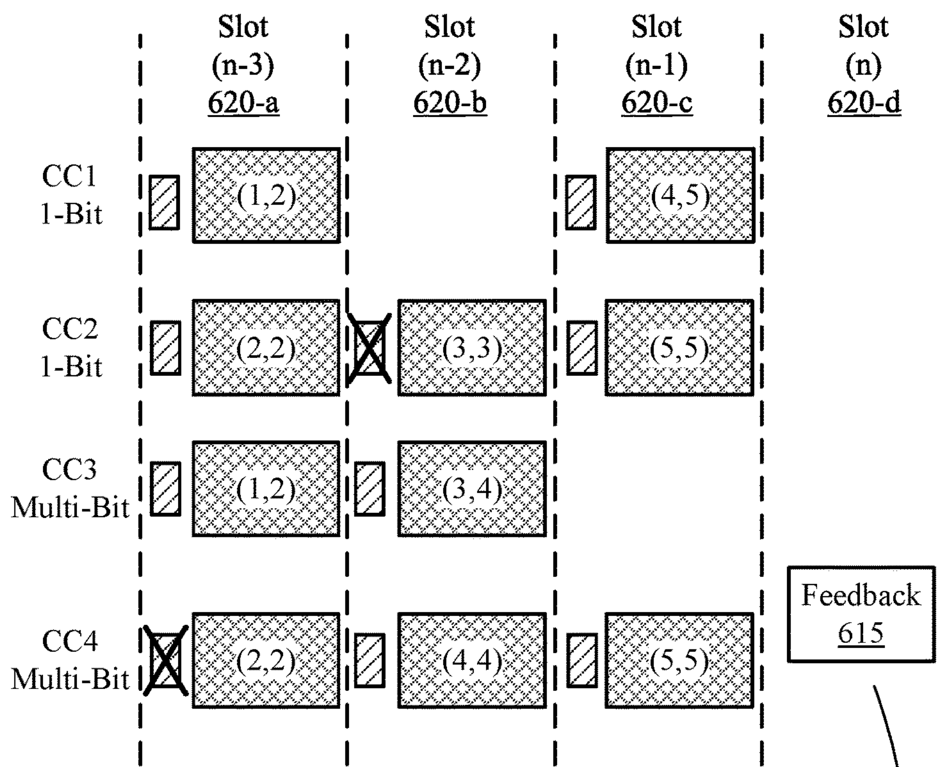
FIG. 6 illustrates an example of a feedback configuration that supports signaling and reporting multi-bit feedback per TB in accordance with aspects of the present disclosure.

FIG. 6 illustrates an example of a feedback configuration 600 that supports signaling and reporting multi-bit feedback per TB in accordance with aspects of the present disclosure. Feedback configuration 600 may implement aspects of wireless communication systems 100 and/or 200 and/or feedback configurations 300, 400, and/or 500. Aspects of feedback configuration 600 may be implemented at and/or implemented by a UE and/or base station, which may be examples of the corresponding devices described herein. In some aspects, the codebook generated according to feedback configuration 600 may be an example of a type 2 codebook.

As discussed above, aspects of the described techniques provide various mechanisms where the base station can signal to a UE an indication of whether feedback for downlink message(s) scheduled for the UE will use single-bit feedback or multi-bit feedback. The UE may monitor for the downlink message(s) transmitted from the base station and generate a codebook for reporting the feedback for each downlink message according to the indication. That is, the codebook may be generated according to the indication conveyed in the signaling using single-bit feedback and multi-bit feedback. The UE may transmit the feedback message to the base station that is based, at least in some aspects, on the codebook. That is, the UE may include the codebook in the feedback message and/or include information in the feedback message associated with the codebook.

Feedback configuration 600 shown in FIG. 6 illustrates a non-limiting example where the feedback reporting for regular vs Turbo HARQ (e.g., single-bit feedback vs multi-bit feedback) is indicated on a per-carrier (per-CC) basis. In this non-limiting example, the base station may transmit signaling to the UE indicating that a first carrier (e.g., CC1) and a second carrier (e.g., CC2) are configured for single-bit feedback (e.g., regular HARQ) and that a third carrier (e.g., CC3) and a fourth carrier (e.g., CC4) are configured for multi-bit feedback (e.g., Turbo HARQ). In some examples, each or some carrier(s) of the CC1-CC4 carriers may be associated with the same cell or with other cells. That is, the base station may use RRC signaling to configure whether each individual CC is to use single-bit feedback or multi-bit feedback. Accordingly, all PDSCHs (e.g., downlink messages) scheduled on a given CC may follow the RRC configuration for that CC (e.g., may use the single-bit or multi-bit feedback configured for that CC).

In the non-limiting example shown in FIG. 6, the DAI pairs are counted across CCs configured for similar feedback. That is, two independent DAI pairs (Counter DAI, Total DAI) are configured per-feedback type (e.g., single-bit feedback vs multi-bit feedback). One DAI pair is used for CC(s) configured for regular HARQ (e.g., single-bit feedback) and another DAI pair is used for CC(s) configured for Turbo HARQ (e.g., for multi-bit feedback). For CC(s) configured for regular HARQ, the UE constructs a regular HARQ subsubcodebook based on the first DAI pair. For CC(s) configured for Turbo HARQ, the UE constructs a Turbo HARQ subsubcodebook based on the second DAI pair. The two subsubcodebooks may then be concatenated to build a TB or CBG based subcodebook, which is then used in generating the codebook. CC1 and CC2 are configured for single-bit feedback, and therefore share a single or first DAI pair in this example. CC3 and CC4 are configured for multi-bit feedback, and therefore share a single or second DAI pair in this example.

In the non-limiting example shown in FIG. 6, the base station may transmit grants 605 on CC1-CC4 during PDCCH monitoring occasions of slot 620-*a* that schedules a corresponding downlink message 610 on CC1-CC4 during slot 620-*a*. The DAI pair of 1,2 indicated in grant 605 scheduling downlink message 610 on CC1 during slot 620-*a* indicates that the downlink message 610 on CC1 is one-of-two downlink messages 610 scheduled on the CC(s) configured with single-bit feedback. The DAI pair of 2,2 indicated in grant 605 scheduling downlink message 610 on CC2 during slot 620-*a* indicates that the downlink message 610 on CC2 is two-of-two downlink messages 610 scheduled on CC(s) configured with single-bit feedback. Since the UE received both grants 605 scheduling the corresponding downlink messages 610 during slot 620-*a* on CC1 and CC2, the UE may generate one actual HARQ ACK/NACK bit for each downlink message 610 in the regular HARQ subsubcodebook.

The DAI pair of 1,2 indicated in grant 605 scheduling downlink message 610 on CC3 during slot 620-*a* indicates that the downlink message 610 on CC3 is one-of-two downlink messages 610 scheduled on the CC(s) configured with multi-bit feedback. The DAI pair of 2,2 indicated in grant 605 scheduling downlink message 610 on CC4 during slot 620-*a* indicates that the downlink message 610 on CC2 is two-of-two downlink messages 610 scheduled on CC(s) configured with multi-bit feedback. The UE may generate multiple actual HARQ ACK/NACK bits in the Turbo HARQ subsubcodebook for the downlink message 610 received on CC3 during slot 620-*a*. However, the UE may miss (e.g., be unable to receive and decode) the grant 605 scheduling the corresponding downlink messages 610 during slot 620-*a* on CC4. Therefore, the UE may generate multiple dummy HARQ bits in the Turbo HARQ subsubcodebook for this downlink messages 610.

The base station may transmit grants 605 on CC2-CC4 during PDCCH monitoring occasions of slot 620-*b* that schedules a corresponding downlink message 610 on CC2-CC4 during slot 620-*b*. The DAI pair of 3,3 indicated in grant 605 scheduling downlink message 610 on CC2 during slot 620-*b* indicates that the downlink message 610 on CC2 is three-of-three downlink messages 610 scheduled on the CC(s) configured with single-bit feedback. However, the UE may have missed (e.g., been unable to receive and decode) the grant 605 scheduling the corresponding downlink messages 610 during slot 620-*b* on CC2. The UE may generate one dummy HARQ bit in the regular HARQ subsubcodebook for this downlink message 610. As no downlink message 610 is scheduled on CC1 during slot 620-*b*, the UE may generate no feedback bits for CC1 during slot 620-*b* in the regular HARQ subsubcodebook.

The DAI pair of 3,4 indicated in grant 605 scheduling downlink message 610 on CC3 during slot 620-*b* indicates that the downlink message 610 on CC3 is three-of-four downlink messages 610 scheduled on the CC(s) configured with multi-bit feedback. The DAI pair of 4,4 indicated in grant 605 scheduling downlink message 610 on CC4 during slot 620-*b* indicates that the downlink message 610 on CC4 is four-of-four downlink messages 610 scheduled on CC(s) configured with multi-bit feedback. The UE may generate multiple actual HARQ ACK/NACK bits in the Turbo HARQ subsubcodebook for each of the downlink messages 610 received on CC3 and CC4 during slot 620-*b*.

The base station may transmit grants 605 on CC1, CC2, and CC4 during PDCCH monitoring occasions of slot 620-*c* that schedules a corresponding downlink message 610 on CC1, CC2, and CC4 during slot 620-*c*. The DAI pair of 4,5 indicated in grant 605 scheduling downlink message 610 on CC1 during slot 620-*c* indicates that the downlink message 610 on CC1 is four-of-five downlink messages 610 scheduled on the CC(s) configured with single-bit feedback. The DAI pair of 5,5 indicated in grant 605 scheduling downlink message 610 on CC2 during slot 620-*c* indicates that the downlink message 610 on CC2 is five-of-five downlink messages 610 scheduled on the CC(s) configured with single-bit feedback. The UE may generate one actual HARQ ACK/NACK bit in the regular HARQ subsubcodebook for each of these downlink messages 610.

The DAI pair of 5,5 indicated in grant 605 scheduling downlink message 610 on CC4 during slot 620-*c* indicates that the downlink message 610 on CC4 is five-of-five downlink messages 610 scheduled on the CC(s) configured with multi-bit feedback. The UE may generate multiple actual HARQ ACK/NACK bits in the Turbo HARQ sub-subcodebook for this downlink messages 610 received on CC4 during slot 620-*c*. As no downlink message 610 is scheduled on CC3 during slot 620-*c*, the UE may generate no feedback bits for CC3 during slot 620-*c* in the Turbo HARQ subsubcodebook.

That is, the UE may subsequently receive the grants 605 scheduling the downlink message 610, with the DAI pairs corresponding to the similar feedback configuration CC(s) having one or more gaps (e.g., 2,2 for the downlink message 610 on CC4 during slot 620-*a* and 3,3 for the downlink message 610 on CC2 during slot 620-*b*). Based on the DAI pair gaps, the UE may know which downlink messages 610 were missed during slot(s) 620 and which slot(s) 620 had not downlink messages 610 scheduled.

Accordingly, the UE may generate, based on the DAI pair associated with the CC1-CC2, a subsubcodebook associated with a subset of the downlink messages 610 (e.g., the downlink messages scheduled on CC1-CC2), which have been configured for single-bit feedback. The UE may generate, based on the DAI pair associated with the CC3-CC4, a subsubcodebook associated with a subset of the downlink messages 610 (e.g., the downlink messages scheduled on CC3-CC4), which have been configured for multi-bit feedback. The UE may concatenate the subsubcodebooks when generating the codebook.

The UE may transmit the feedback message 615 to the base station that is based, at least in some aspects, on the codebook. That is, the UE may include the codebook in the feedback message 615 and/or may include information usable by the base station to identify or otherwise determine codebook.

In some examples, a fallback position may be that if Turbo HARQ is configured on any active CC, then the UE and/or base station may determine that all active CCs are also configured for Turbo HARQ (e.g., for multi-bit feedback). That is, the UE may determine that at least one CC of the configured CCs of the UE are configured for downlink messages 610 using multi-bit feedback. In this fallback scenario (not shown in FIG. 6), the UE may generate the codebook using multi-bit feedback for each CC.

Figure 7:
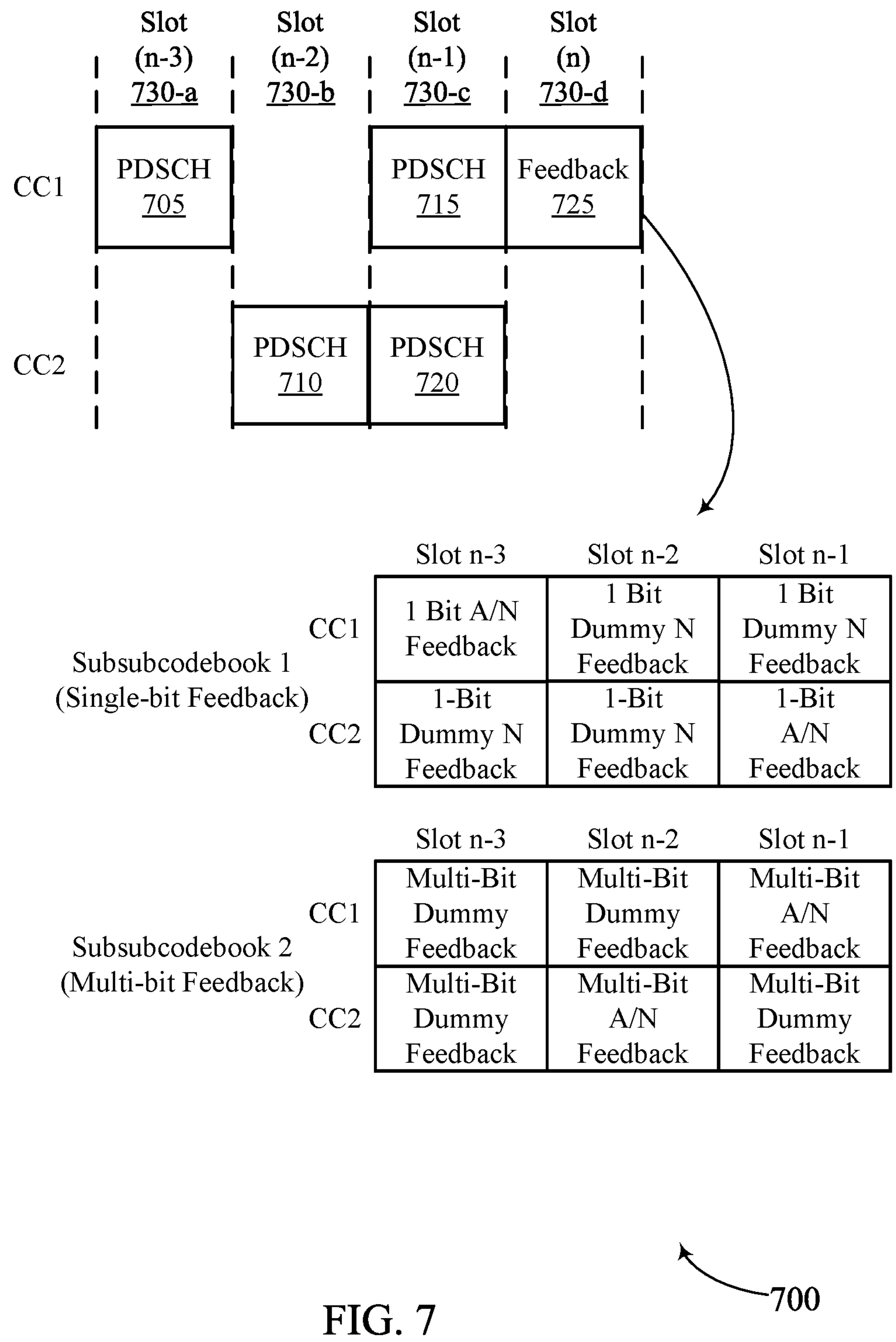
FIG. 7 illustrates an example of a feedback configuration that supports signaling and reporting multi-bit feedback per TB in accordance with aspects of the present disclosure.

FIG. 7 illustrates an example of a feedback configuration 700 that supports signaling and reporting multi-bit feedback per TB in accordance with aspects of the present disclosure. Feedback configuration 700 may implement aspects of wireless communication systems 100 and/or 200 and/or feedback configurations 300, 400, 500, and/or 600. Aspects of feedback configuration 700 may be implemented at and/or implemented by a UE and/or base station, which may be examples of the corresponding devices described herein. In some aspects, the codebook generated according to feedback configuration 700 may be an example of a type 1 codebook. In some aspects, feedback configuration 700 illustrates an example where the indication of whether the feedback uses single-bit vs multi-bit feedback is based on a CORESET ID (e.g., a particular CORESET ID or group/pool of CORESETs are associated with single-bit feedback where a different CORESET ID or group/pool of CORESETS are associated with multi-bit feedback). In other aspects, feedback configuration 700 illustrates an example where the indication of whether the feedback uses single-bit vs multi-bit feedback is based on a bit carrier in the DCI scheduling the downlink message(s).

As discussed above, aspects of the described techniques provide various mechanisms where the base station can signal to a UE an indication of whether feedback for downlink message(s) scheduled for the UE will use single-bit feedback or multi-bit feedback. The UE may monitor for the downlink message(s) transmitted from the base station and generate a codebook for reporting the feedback for each downlink message according to the indication. That is, the codebook may be generated according to the indication conveyed in the signaling using single-bit feedback and multi-bit feedback. The UE may transmit the feedback message to the base station that is based, at least in some aspects, on the codebook. That is, the UE may include the codebook in the feedback message and/or include information in the feedback message associated with the codebook.

Feedback configuration 700 shown in FIG. 7 illustrates a non-limiting example where the feedback reporting for regular vs Turbo HARQ (e.g., single-bit feedback vs multi-bit feedback) is indicated on a per-CORESET identifier (ID) and/or a per-group or pool of CORESETs basis. In this non-limiting example, the base station may transmit signaling to the UE indicating that a first CORESET ID and/or a first CORESET group/pool ID is configured for single-bit feedback (e.g., regular HARQ) and that a second CORESET ID and/or a second CORESET group/pool ID is configured for multi-bit feedback (e.g., Turbo HARQ). That is, the base station may use attributes of the PDCCH signaling to configure whether the PDCCH signal scheduling each downlink message (e.g., PDSCH) using a first CORESET ID/CORESET group/pool ID is to use single-bit feedback or using a second CORESET ID/CORESET group/pool ID is to use multi-bit feedback. Accordingly, all PDSCHs (e.g., downlink messages) scheduled by a PDCCH signal using a given CORESET ID/CORESET group/pool ID may follow the feedback configuration for that CORESET ID/CORESET group/pool ID (e.g., may use the single-bit or multi-bit feedback configured for downlink messages scheduled using PDCCH signaling on a given CORESET ID/CORESET group/pool ID).

That is, for each PDCCH occasion, the UE may generate two feedbacks. A first subsubcodebook is for each PDSCH occasion and uses single-bit feedback and a second subsubcodebook is also for each PDSCH occasion and uses multi-bit feedback. Accordingly, the UE may determine the CORESET ID/CORESET group/pool ID associated with the PDCCH message (e.g., which CORESET/group or pool of CORESETs the scheduling DCI grant is received in) scheduling a downlink message and use the CORESET/CORESET group/pool ID to determine if the corresponding downlink message uses single-bit feedback or multi-bit feedback. The feedback for single-bit feedback may go to a first HARQ-ACK subcodebook and the feedback for multi-bit feedback may go to a second HARQ-ACK subcodebook. That is, in some examples the CORESET associated with PDCCH messages scheduling the downlink message(s) may use a group or pool of CORESETs, with each group or pool having an associated CORESET group/pool ID. For example, CORESET group/pool ID 1 may include CORESET ID 1 and CORESET ID 2, whereas CORESET group/pool ID 2 may include CORESET ID 3 and CORESET ID 4. The PDSCH scheduled by PDCCH in CORESET group/pool ID 1 may use single-bit feedback in the first subsubcodebook. In the non-limiting example shown in FIG. 7, the base station may schedule a first downlink message (e.g., PDSCH 705) on CC1 during a slot 730-*a*, a second downlink message (e.g., PDSCH 710) on CC2 during slot 730-*b*, and a third downlink message (e.g., PDSCH 715) and a fourth downlink message (e.g., PDSCH 720) during slot 730-*c*. The uplink resources configured to provide feedback for the downlink messages are scheduled during slot 730-*d*. Accordingly, the UE may monitor the first carrier and the second carrier to receive and decode the scheduled downlink messages. The UE may identify the CORESET ID/CORESET group/pool ID that the grant scheduling each downlink message was received on. As the signaling indicated that the feedback was configured on a per-CORESET ID/CORESET group/pool ID basis, this may indicate to the UE that the codebook may be generated using single-bit feedback or multi-bit feedback on the per-CORESET ID/CORESET group/pool ID basis. In this example, this may include the UE generating the codebook using single-bit feedback for downlink message(s) scheduled on the first CORESET ID/CORESET group/pool ID and using multi-bit feedback for downlink message(s) scheduled on the second CORESET ID/CORESET group/pool ID.

In the non-limiting example shown in FIG. 7, this may include the UE generating a codebook that forms the basis for the feedback message 725. The example codebook illustrated in FIG. 7 includes two subsubcodebooks being generated. That is, the UE may generate a first subcodebook (or subsubcodebook) using single-bit feedback for each monitoring occasion. This may include the UE generating the first subsubcodebook using one actual HARQ ACK/NACK bit (e.g., single-bit feedback) for the PDSCH 705 received on CC1 during slot 730-*a* and for the PDSCH 720 received on CC2 during slot 730-*c*. This may be because these downlink messages are scheduled by grants received on a first CORESET ID/CORESET group/pool ID. The UE may generate the first subsubcodebook using one dummy HARQ NACK bit (e.g., single bit feedback) for the PDSCH 710 received on CC2 during slot 730-*b* and for the PDSCH 715 received on CC1 during slot 730-*c*. This may be because these downlink messages are scheduled by grants received on a second CORESET ID/CORESET group/pool ID. The UE may also generate one dummy HARQ NACK bit (e.g., single-bit feedback) for CC2 during slot 730-*a* and for CC1 during slot 730-*b* as these PDSCH occasions have no scheduled downlink messages.

For the second subsubcodebook, the UE may generate the second subcodebook (or subsubcodebook) using multi-bit feedback for each monitoring occasion. This may include the UE generating the second subsubcodebook using multiple actual HARQ ACK/NACK bits (e.g., multi-bit feedback) for the PDSCH 715 received on CC1 during slot 730-*c* and for the PDSCH 710 received on CC2 during slot 730-*b*. This may be because these downlink messages are scheduled by grants received on a second CORESET ID/CORESET group/pool ID. The UE may generate the second subsubcodebook using multiple dummy HARQ NACK bits (e.g., multi-bit feedback) for the PDSCH 705 received on CC1 during slot 730-*a* and for the PDSCH 720 received on CC2 during slot 730-*c*. This may be because these downlink messages are scheduled by grants received on the first CORESET ID/CORESET group/pool ID. The UE may also generate multiple dummy HARQ NACK bits (e.g., single-bit feedback) for CC2 during slot 730-*a* and for CC1 during slot 730-*b* as these PDSCH occasions have no scheduled downlink messages.

For a type 2 codebook, this may include the base station using RRC signaling to partition the PDCCH CORESETS into two groups/pools (e.g., into the first CORESET ID and second CORESET ID). PDSCH scheduled by PDCCH in group/pool 1 may use single-bit HARQ ACK/NACK feedback and PDSCH scheduled by PDCCH in group/pool 2 may use multi-bit HARQ ACK/NACK feedback. In some aspects, the different CORESET ID groups/pools may be different DAI pairs (e.g., one DAI pair per CORESET ID). The UE may generate the HARQ ACK/NACK subsubcodebook for PDSCH(s) scheduled by PDCCH(s) in group/pool 1 according to the DAI pair associated with that CORESET ID. The UE may generate the HARQ ACK/NACK subsubcodebook for PDSCH(s) scheduled by PDCCH(s) in group/pool 2 according to the DAI pair associated with that CORESET ID. The two HARQ-ACK subsubcodebooks may then be concatenated to generate the final codebook. That is, the UE may generate a first subsubcodebook using single-bit feedback for a subset of the downlink messages based at least in some aspects on the UE monitoring the first CORESET ID. The UE may generate the second subsubcodebook using multi-bit feedback for a second subset of the downlink messages based at least in some aspects on the UE monitoring the second CORESET ID.

Another approach where an attribute of the scheduling PDCCH may be used as the signaling to indicate single-bit vs multi-bit feedback may be based on a scrambling ID. For example, the base station may configure new scrambling ID(s) for PDCCH. PDSCH scheduled by the PDCCH using the new scrambling ID(s) may be configured for multi-bit feedback whereas PDSCH scheduled by a second or legacy scrambling ID(s) may be configured for single-bit feedback. That is, the UE may identify or otherwise determine an identifier (e.g., a scrambling ID) associated with the PDCCH message (e.g., DCI grant) scheduling downlink message(s). The codebook may be generated using single-bit feedback based on a first identifier (e.g., a first scrambling ID) and using multi-bit feedback based on a second identifier (e.g., a second scrambling ID). The codebook in this scrambling ID example may also be generated where the two types of PDCCH are differentiated by the two scrambling IDs (e.g., as opposed to the different CORESET IDs discussed above).

Yet another approach where an attribute of the scheduling PDCCH may be used as signaling to indicate single-bit vs multi-bit feedback may be based on a PDCCH format. For example, the base station may introduce new PDCCH format(s) (e.g., new PDCCH DCI format(s) scheduling the downlink messages). PDSCH scheduled by the new or first PDCCH format may use multi-bit feedback whereas PDSCH scheduled by the legacy or second PDCCH format may use single-bit feedback. Accordingly, the UE may determine the format of the PDCCH message (e.g., the DCI grant) scheduling the downlink messages and generate the codebook using single-bit feedback based on a first PDCCH format and using multi-bit feedback based on a second PDCCH format. This may enable the codebook to be generated using single-bit vs. multi-bit feedback, where the feedback is differentiated based on the PDCCH format.

Yet another approach where the signaling indicating single-bit vs multi-bit feedback may be based on a bit included in the DCI scheduling the respective monitoring occasion. That is, the DCI scheduling each downlink message may include a bit that indicates whether that scheduled downlink message uses single-bit feedback or multi-bit feedback.

For a type 1 codebook, this may include, for each PDSCH occasion, the UE generating two feedbacks (e.g., as discussed above), with one subsubcodebook using single-bit feedback and the second subsubcodebook using multi-bit feedback. The single-bit feedback subsubcodebook may be used in a first HARQ-ACK subcodebook and the multi-bit feedback subsubcodebook may be used on a second HARQ-ACK subcodebook used to generate the codebook.

For a type 2 codebook, this may include the base station using a bit in the scheduling PDCCH to indicate whether the feedback for the scheduled PDSCH is single-bit feedback or multi-bit feedback. Two DAI pairs may be used in this example, where one DAI pair may be associated with single-bit feedback and a second DAI pair may be associated with multi-bit feedback. The PDSCH(s) indicated as using single-bit feedback by the single DCI bit may be used to construct a HARQ-ACK subsubcodebook based on the first DAI pair and PDSCH(s) indicated as using multi-bit feedback by the single DCI bit may be used to construct a HARQ-ACK subsubcodebook based on the second DAI pair. Accordingly, the UE may, for each monitoring occasion, determine whether to use single-bit feedback or multi-bit feedback based on the bit indicated in the DCI scheduling the respective monitoring occasion. The two HARQ-ACK subcodebooks may then be concatenated to generate the final codebook.

The UE may transmit the feedback message 725 to the base station that is based, at least in some aspects, on the codebook. That is, the UE may include the codebook in the feedback message 725 and/or may include information usable by the base station to identify or otherwise determine codebook.

Figure 8:
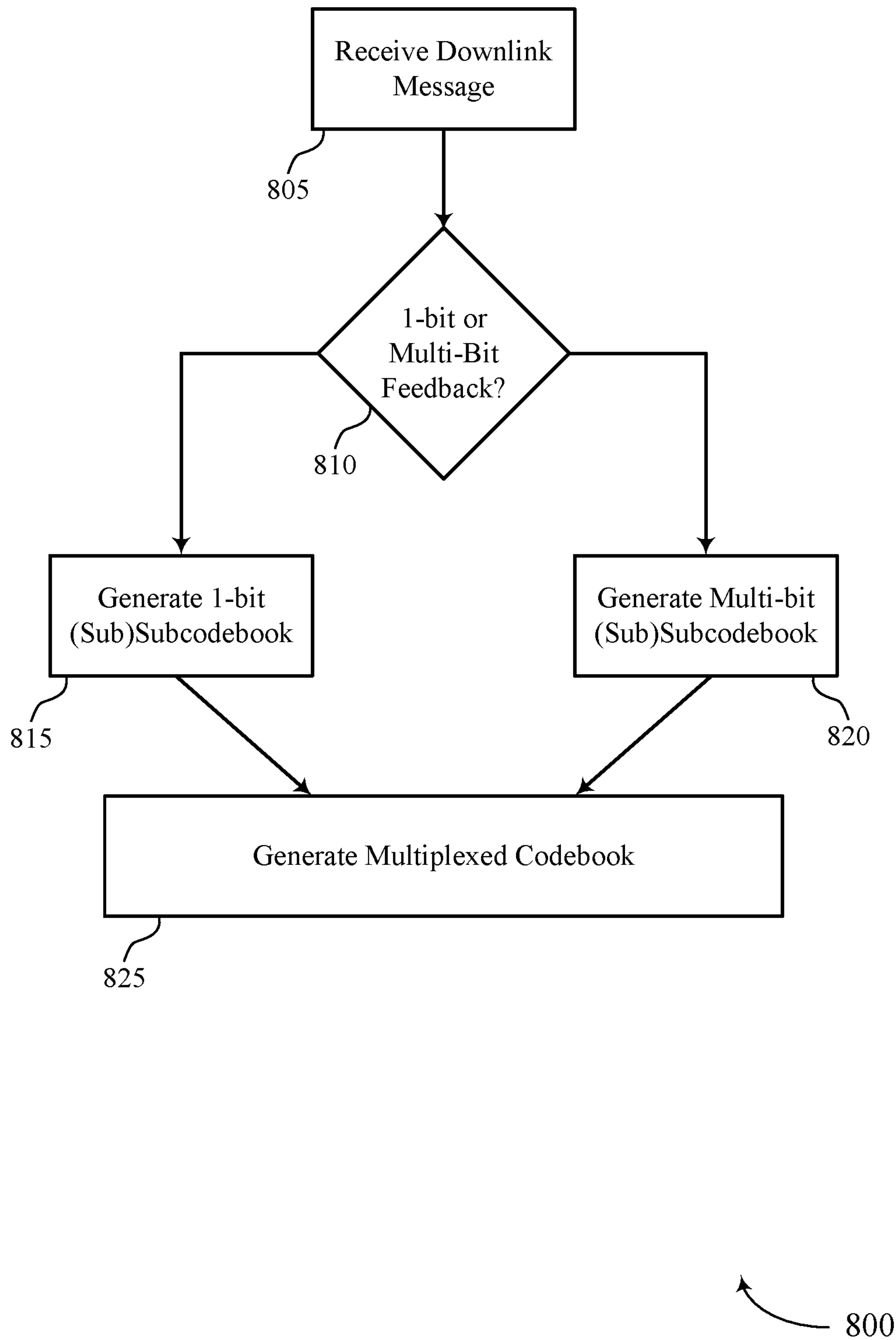
FIG. 8 illustrates an example of a flowchart that supports signaling and reporting multi-bit feedback per TB in accordance with aspects of the present disclosure.

FIG. 8 illustrates an example of a flowchart 800 that supports signaling and reporting multi-bit feedback per TB in accordance with aspects of the present disclosure. Flowchart 800 may implement aspects of wireless communication systems 100 and/or 200 and/or feedback configurations 300-700. Aspects of flowchart 800 may be implemented at or implemented by a base station and/or UE, which may be examples of the corresponding devices described herein.

At 805, the UE may receive one or more downlink messages. For example, the UE may monitor PDCCH monitoring occasions to detect a grant (e.g., a PDCCH DCI grant) scheduling the downlink transmission(s). The downlink message(s) may be received on a PDSCH channel. The operations of 805 may be performed in accordance with examples as disclosed herein. In some examples, aspects of the operations of 805 may be performed by a communication manager as described herein.

At 810, the UE may determine, for each downlink message received at 805, whether the feedback for the downlink message uses single-bit feedback or multi-bit feedback. For example, the UE may receive signaling indicating whether received downlink message(s) use the single-bit feedback or the multi-bit feedback. The signaling may include RRC signaling in some examples. In other examples, the signaling may include leveraging aspects of PDCCH signaling to carry or otherwise convey the indication of the single-bit feedback or multi-bit feedback. For example, the CORESET ID, scrambling ID, DCI format, and the like, used to schedule the downlink message(s) may be used to indicate whether the downlink message(s) use single-bit feedback or multi-bit feedback. In other examples, a bit in the DCI scheduling the downlink message may be used to indicate whether the scheduled downlink message uses single-bit feedback or multi-bit feedback. The operations of 810 may be performed in accordance with examples as disclosed herein. In some examples, aspects of the operations of 810 may be performed by a communication manager as described herein.

At 815, the UE may generate the single-bit subsubcodebook or subcodebook for downlink messages configured for single-bit feedback. For example, the UE may include one actual HARQ ACK/NACK bit in the subsubcodebook or subcodebook for scheduled PDSCH occasions. The UE may include one dummy HARQ bit in the subsubcodebook or subcodebook for scheduled PDSCH occasions that were not received (e.g., as indicated by the DAI pair). The UE may include no HARQ bits in the subsubcodebook or subcodebook for unscheduled PDSCH occasions. The operations of 815 may be performed in accordance with examples as disclosed herein. In some examples, aspects of the operations of 815 may be performed by a communication manager as described herein.

At 820, the UE may generate the multi-bit subsubcodebook or subcodebook for downlink messages configured for multi-bit feedback. For example, the UE may include multiple actual HARQ ACK/NACK bits in the subsubcodebook or subcodebook for scheduled PDSCH occasions. The UE may include multiple dummy HARQ bits in the subsubcodebook or subcodebook for scheduled PDSCH occasions that were not received (e.g., as indicated by the DAI pair). The UE may include no HARQ bits in the subsubcodebook or subcodebook for unscheduled PDSCH occasions. The operations of 820 may be performed in accordance with examples as disclosed herein. In some examples, aspects of the operations of 820 may be performed by a communication manager as described herein.

At 825, the UE may generate the codebook for reporting feedback for each downlink message. For example, the UE may concatenate the single-bit feedback subsubcodebook with the multi-bit feedback subsubcodebook to obtain a subcodebook. The UE may concatenate the subcodebook with another subcodebook (e.g., HP vs LP, TRP1 vs TRP2, etc.) to form the codebook. The UE may transmit a feedback message to the base station based at least in part on the codebook (e.g., explicitly include the codebook or implicitly indicate the codebook). The operations of 825 may be performed in accordance with examples as disclosed herein. In some examples, aspects of the operations of 825 may be performed by a communication manager as described herein.

Figure 9:
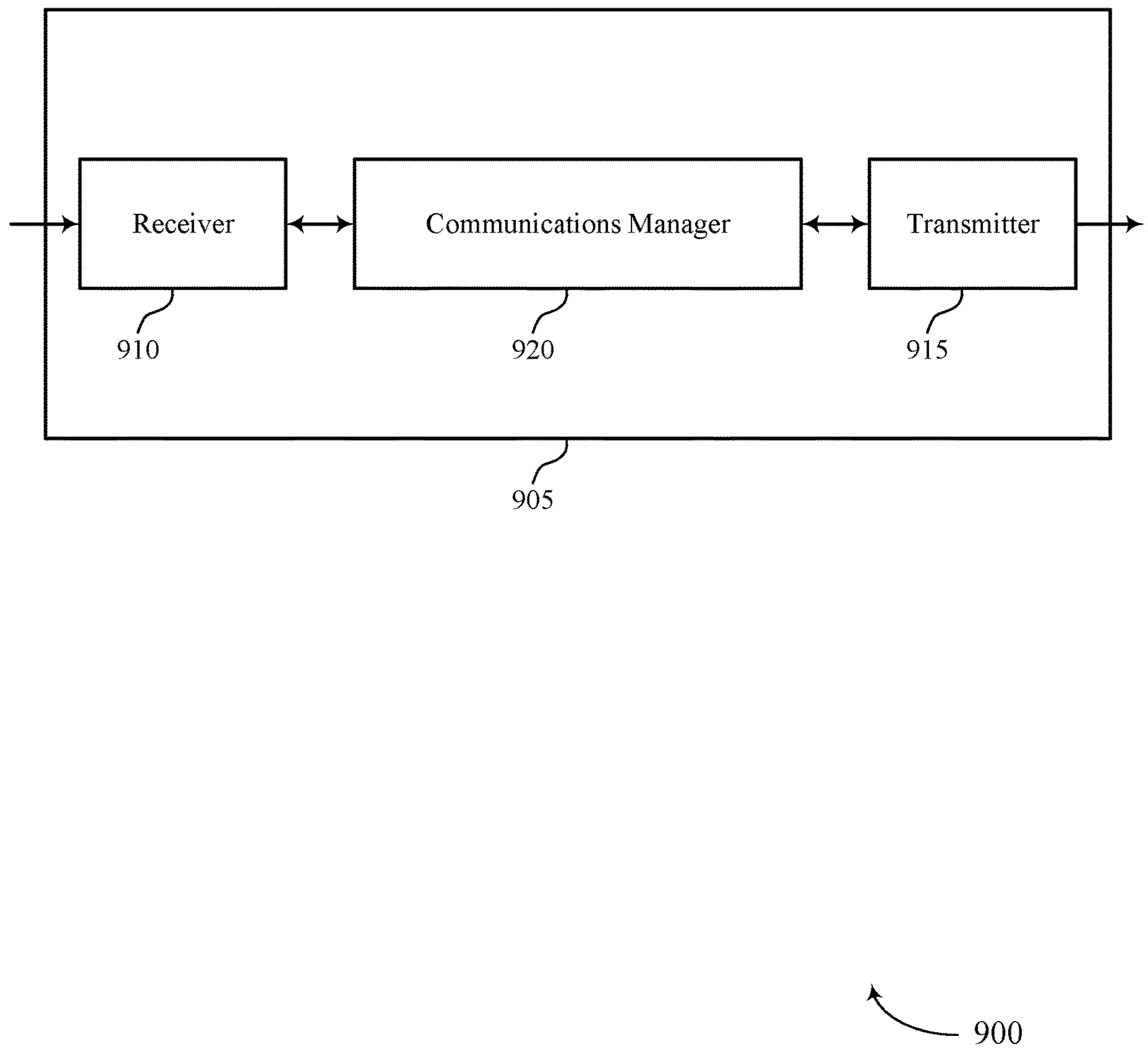
FIGS. 9 and 10 show block diagrams of devices that support signaling and reporting multi-bit feedback per TB in accordance with aspects of the present disclosure.

FIG. 9 shows a block diagram 900 of a device 905 that supports signaling and reporting multi-bit feedback per TB in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to signaling and reporting multi-bit feedback per TB). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to signaling and reporting multi-bit feedback per TB). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of signaling and reporting multi-bit feedback per TB as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for receiving signaling that indicates whether feedback for each of one or more downlink messages scheduled to be received at the UE is to be single-bit feedback or multi-bit feedback. The communications manager 920 may be configured as or otherwise support a means for monitoring for the one or more downlink messages. The communications manager 920 may be configured as or otherwise support a means for generating, basing at least in part on the monitoring for the one or more downlink messages, a codebook for reporting the feedback pertaining to each downlink message, the codebook supporting inclusion of both single-bit feedback and multi-bit feedback based on the signaling. The communications manager 920 may be configured as or otherwise support a means for transmitting a feedback message that is based on the codebook.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for multiplexing single-bit feedback and multi-bit feedback in a HARQ-ACK codebook based on signaling from a base station.

Figure 10:
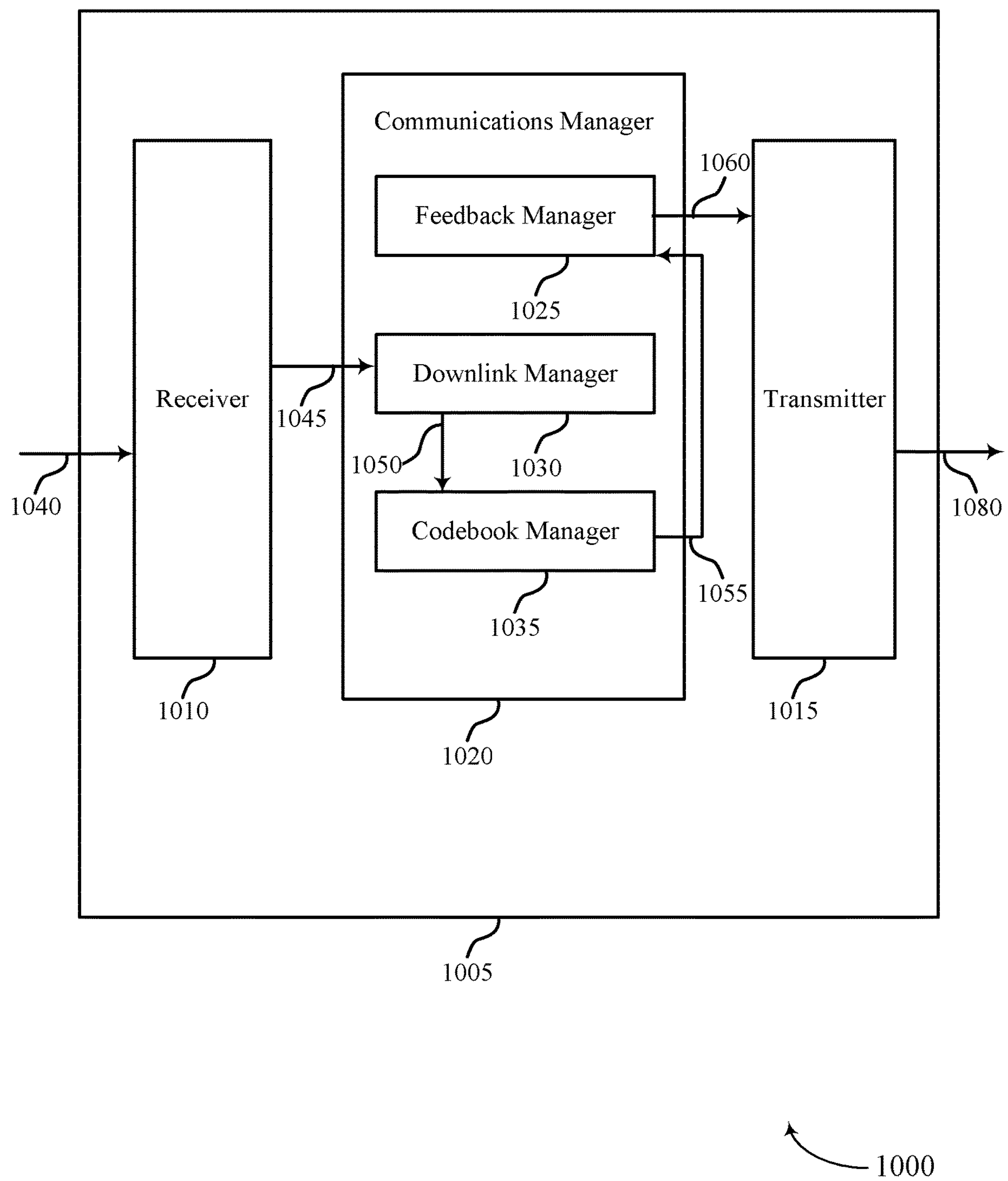

FIG. 10 shows a block diagram 1000 of a device 1005 that supports signaling and reporting multi-bit feedback per TB in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to signaling and reporting multi-bit feedback per TB). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to signaling and reporting multi-bit feedback per TB). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of signaling and reporting multi-bit feedback per TB as described herein. For example, the communications manager 1020 may include a feedback manager 1025, a downlink manager 1030, a codebook manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The feedback manager 1025 may be configured as or otherwise support a means for receiving signaling 1040 that indicates whether feedback for each of one or more downlink messages scheduled to be received at the UE is to be single-bit feedback or multi-bit feedback. The downlink manager 1030 may be configured as or otherwise support a means for monitoring for the one or more downlink messages via signals 1045. The codebook manager 1035 may be configured as or otherwise support a means for generating, based on the monitoring for the one or more downlink messages via signal 1050, a codebook for reporting the feedback pertaining to each downlink message, the codebook supporting inclusion of both single-bit feedback and multi-bit feedback based on the signaling. The feedback manager 1025 may be configured as or otherwise support a means for transmitting, via signal 1060, a feedback message that is based on the codebook received via signal 1055.

Figure 11:
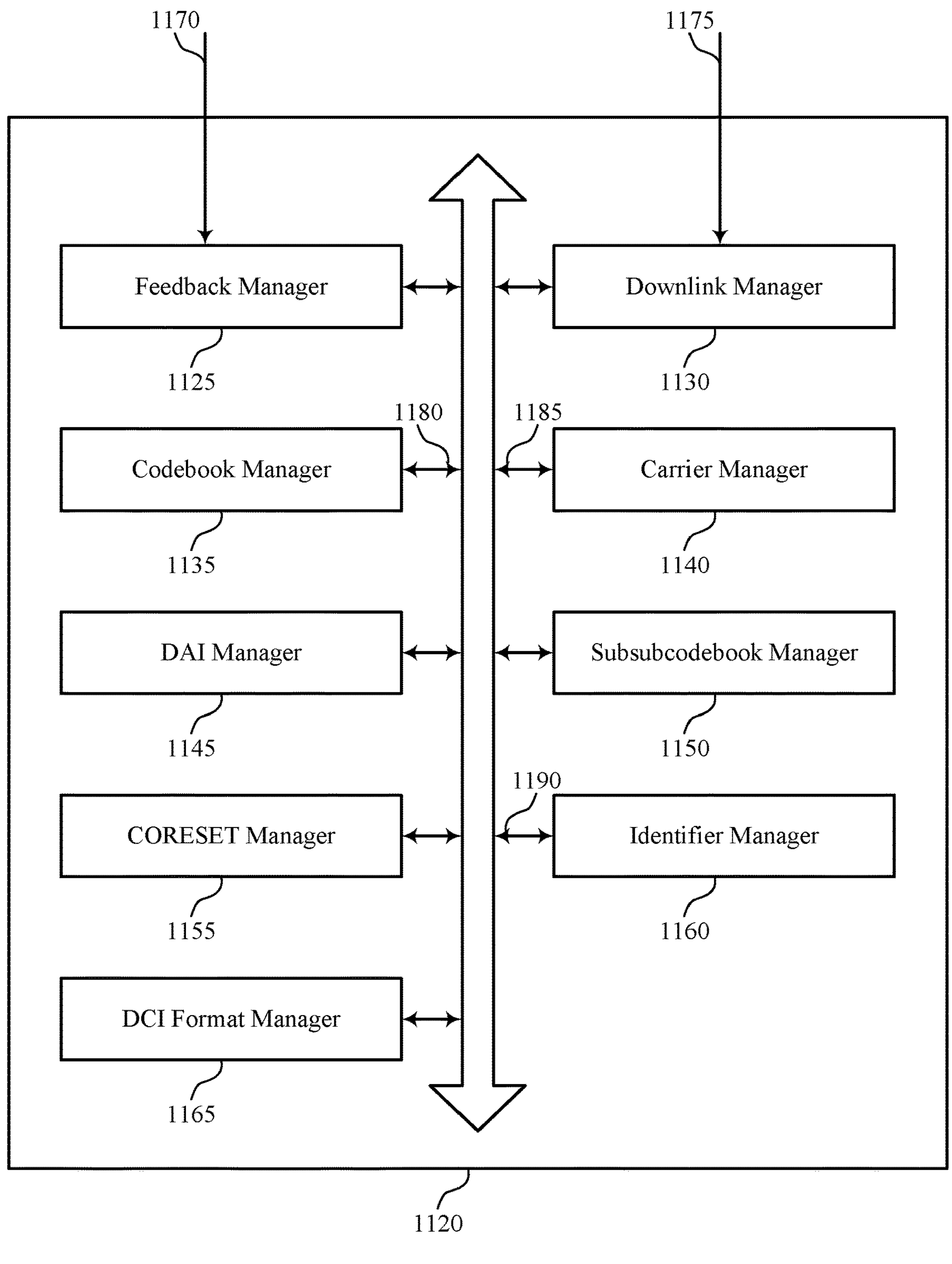
FIG. 11 shows a block diagram of a communications manager that supports signaling and reporting multi-bit feedback per TB in accordance with aspects of the present disclosure.

FIG. 11 shows a block diagram 1100 of a communications manager 1120 that supports signaling and reporting multi-bit feedback per TB in accordance with aspects of the present disclosure. The communications manager 1120 may be an example of aspects of a communications manager 920, a communications manager 1020, or both, as described herein. The communications manager 1120, or various components thereof, may be an example of means for performing various aspects of signaling and reporting multi-bit feedback per TB as described herein. For example, the communications manager 1120 may include a feedback manager 1125, a downlink manager 1130, a codebook manager 1135, a carrier manager 1140, a DAI manager 1145, a subsubcodebook manager 1150, a CORESET manager 1155, an identifier manager 1160, a DCI format manager 1165, or any combination thereof. Each of these components may communicate, directly or indirectly, with one another (e.g., via one or more buses).

The communications manager 1120 may support wireless communication at a UE in accordance with examples as disclosed herein. The feedback manager 1125 may be configured as or otherwise support a means for receiving signaling 1170 that indicates whether feedback for each of one or more downlink messages scheduled to be received at the UE is to be single-bit feedback or multi-bit feedback. The downlink manager 1130 may be configured as or otherwise support a means for monitoring for the one or more downlink messages via signal 1175. The codebook manager 1135 may be configured as or otherwise support a means for generating, based on the monitoring for the one or more downlink messages, a codebook for reporting the feedback pertaining to each downlink message via signal 1180, the codebook supporting inclusion of both single-bit feedback and multi-bit feedback based on the signaling. In some examples, the feedback manager 1125 may be configured as or otherwise support a means for transmitting a feedback message that is based on the codebook.

In some examples, the carrier manager 1140 may be configured as or otherwise support a means for identifying, for each of the one or more downlink messages, a component carrier that the downlink message was received on via signal 1185, where the signaling indicates whether the feedback is to be single-bit feedback or multi-bit feedback on a per-component carrier basis. In some examples, the UE generates the codebook on a carrier-first then slot-second basis or on a slot-first then carrier-second basis. In some examples, the multi-bit feedback includes one or more sets of multiple dummy bits in the codebook. In some examples, each set of multiple dummy bits corresponds to a potential downlink message.

In some examples, the DAI manager 1145 may be configured as or otherwise support a means for generating, based on a first DAI pair associated with a first component carrier, a first subsubcodebook associated with a first subset of the one or more downlink messages, the first subsubcodebook supporting inclusion of single-bit feedback. In some examples, the DAI manager 1145 may be configured as or otherwise support a means for generating, based on a second DAI pair associated with a second component carrier, a second subsubcodebook associated with a second subset of the one or more downlink messages, the second subsubcodebook supporting inclusion of multi-bit feedback. In some examples, the DAI manager 1145 may be configured as or otherwise support a means for concatenating the first subsubcodebook and the second subsubcodebook to generate the codebook.

In some examples, the subsubcodebook manager 1150 may be configured as or otherwise support a means for generating a first subsubcodebook associated with a first subset of the one or more downlink messages whose feedback is indicated as being single-bit feedback. In some examples, the subsubcodebook manager 1150 may be configured as or otherwise support a means for generating a second subsubcodebook associated with a second subset of the one or more downlink messages whose feedback is indicated as being multi-bit feedback. In some examples, the subsubcodebook manager 1150 may be configured as or otherwise support a means for concatenating the first subsubcodebook and the second subsubcodebook to generate the codebook.

In some examples, the carrier manager 1140 may be configured as or otherwise support a means for determining, based on the signaling, that at least one component carrier of a set of component carriers configured for the one or more downlink messages uses multi-bit feedback. In some examples, the carrier manager 1140 may be configured as or otherwise support a means for generating the codebook using multi-bit feedback for each component carrier in the set of component carriers based on the at least one component carrier using multi-bit feedback.

In some examples, the CORESET manager 1155 may be configured as or otherwise support a means for determining a control resource set identifier associated with a physical downlink control channel message scheduling the one or more downlink messages, where the codebook is generated to support single-bit feedback based on a first control resource set identifier and to support multi-bit feedback based on a second control resource set identifier.

In some examples, the CORESET manager 1155 may be configured as or otherwise support a means for generating, for each monitoring occasion associated with the one or more downlink messages, a first subcodebook that supports inclusion of single-bit feedback. In some examples, the CORESET manager 1155 may be configured as or otherwise support a means for generating, for each monitoring occasion associated with the one or more downlink messages, a second subcodebook that supports inclusion of multi-bit feedback. In some examples, the CORESET manager 1155 may be configured as or otherwise support a means for concatenating the first subcodebook and the second subcodebook to generate the codebook.

In some examples, the CORESET manager 1155 may be configured as or otherwise support a means for generating, based on monitoring a first control resource set, a first subsubcodebook that supports inclusion of single-bit feedback for a first subset of downlink messages of the one or more downlink messages. In some examples, the CORESET manager 1155 may be configured as or otherwise support a means for generating, based on monitoring a second control resource set, a second subsubcodebook that supports inclusion of multi-bit feedback for a second subset of downlink messages of the one or more downlink messages. In some examples, the CORESET manager 1155 may be configured as or otherwise support a means for concatenating the first subcodebook and the second subcodebook to generate the codebook.

In some examples, the identifier manager 1160 may be configured as or otherwise support a means for determining an identifier associated with a physical downlink control channel message scheduling the one or more downlink messages via signal 1190, where the codebook is generated to support single-bit feedback based on a first value of the identifier and to support multi-bit feedback based on a second value of the identifier.

In some examples, the DCI format manager 1165 may be configured as or otherwise support a means for determining a format of a physical downlink control channel message scheduling the one or more downlink messages, where the codebook is generated to support single-bit feedback based on a first format of the physical downlink control channel message and to support multi-bit feedback based on a second format of the physical downlink control channel message.

In some examples, the DCI format manager 1165 may be configured as or otherwise support a means for determining, for each monitoring occasion associated with the one or more downlink messages, whether the feedback is to be single-bit feedback or multi-bit feedback based on a single bit indicated in a downlink control information scheduling the respective monitoring occasion.

Figure 12:
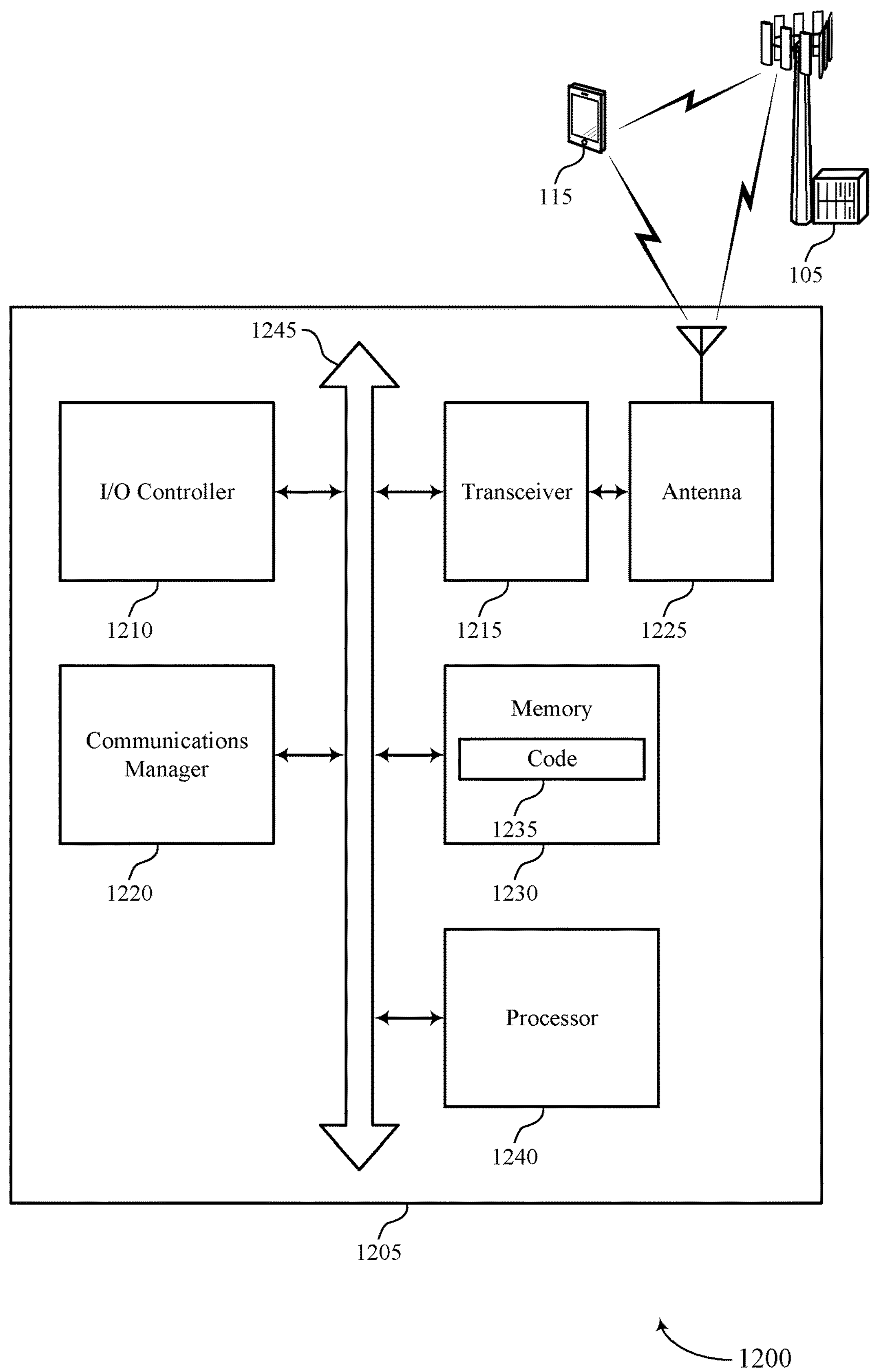
FIG. 12 shows a diagram of a system including a device that supports signaling and reporting multi-bit feedback per TB in accordance with aspects of the present disclosure.

FIG. 12 shows a diagram of a system 1200 including a device 1205 that supports signaling and reporting multi-bit feedback per TB in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting signaling and reporting multi-bit feedback per TB). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving signaling that indicates whether feedback for each of one or more downlink messages scheduled to be received at the UE is to be single-bit feedback or multi-bit feedback. The communications manager 1220 may be configured as or otherwise support a means for monitoring for the one or more downlink messages. The communications manager 1220 may be configured as or otherwise support a means for generating, basing at least in part on the monitoring for the one or more downlink messages, a codebook for reporting the feedback pertaining to each downlink message, the codebook supporting inclusion of both single-bit feedback and multi-bit feedback based on the signaling. The communications manager 1220 may be configured as or otherwise support a means for transmitting a feedback message that is based on the codebook.

By including or configuring the communications manager 1220 in accordance with examples as described herein, the device 1205 may support techniques for multiplexing single-bit feedback and multi-bit feedback in a HARQ-ACK codebook based on signaling from a base station.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of signaling and reporting multi-bit feedback per TB as described herein, or the processor 1240 and the memory 1230 may be otherwise configured to perform or support such operations.

Figure 13:
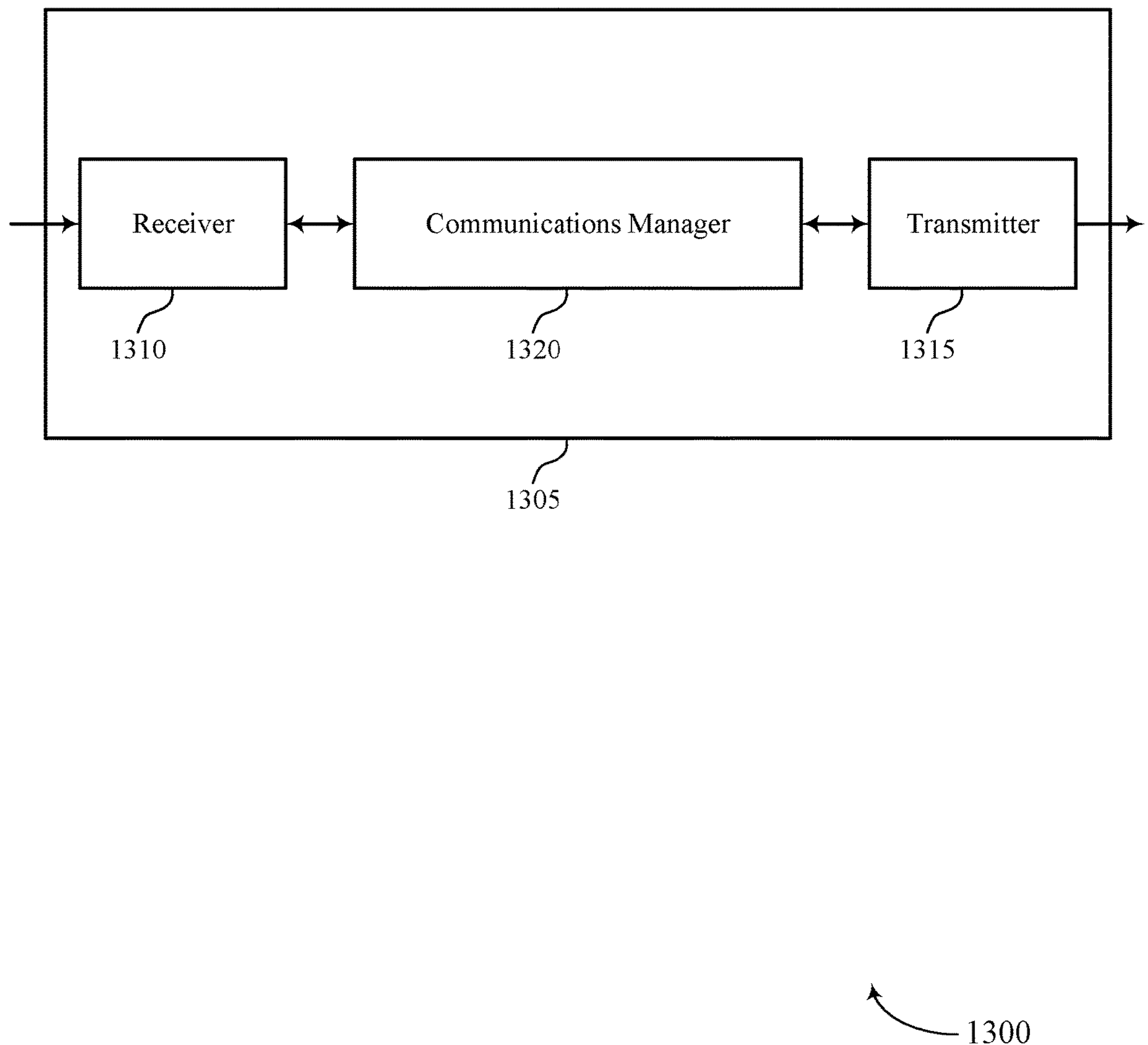
FIGS. 13 and 14 show block diagrams of devices that support signaling and reporting multi-bit feedback per TB in accordance with aspects of the present disclosure.

FIG. 13 shows a block diagram 1300 of a device 1305 that supports signaling and reporting multi-bit feedback per TB in accordance with aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to signaling and reporting multi-bit feedback per TB). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to signaling and reporting multi-bit feedback per TB). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of signaling and reporting multi-bit feedback per TB as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. For example, the communications manager 1320 may be configured as or otherwise support a means for transmitting, to a UE, signaling that indicates whether feedback for each of one or more downlink messages scheduled to be received by the UE is to be single-bit feedback or multi-bit feedback. The communications manager 1320 may be configured as or otherwise support a means for transmitting the one or more downlink messages to the UE. The communications manager 1320 may be configured as or otherwise support a means for receiving a feedback message from the UE responsive to the one or more downlink messages, the feedback message reporting the feedback pertaining to each downlink message based on a codebook generated by the UE, the codebook supporting inclusion of both single-bit feedback and multi-bit feedback based on the signaling.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for multiplexing single-bit feedback and multi-bit feedback in a HARQ-ACK codebook based on signaling from a base station.

Figure 14:
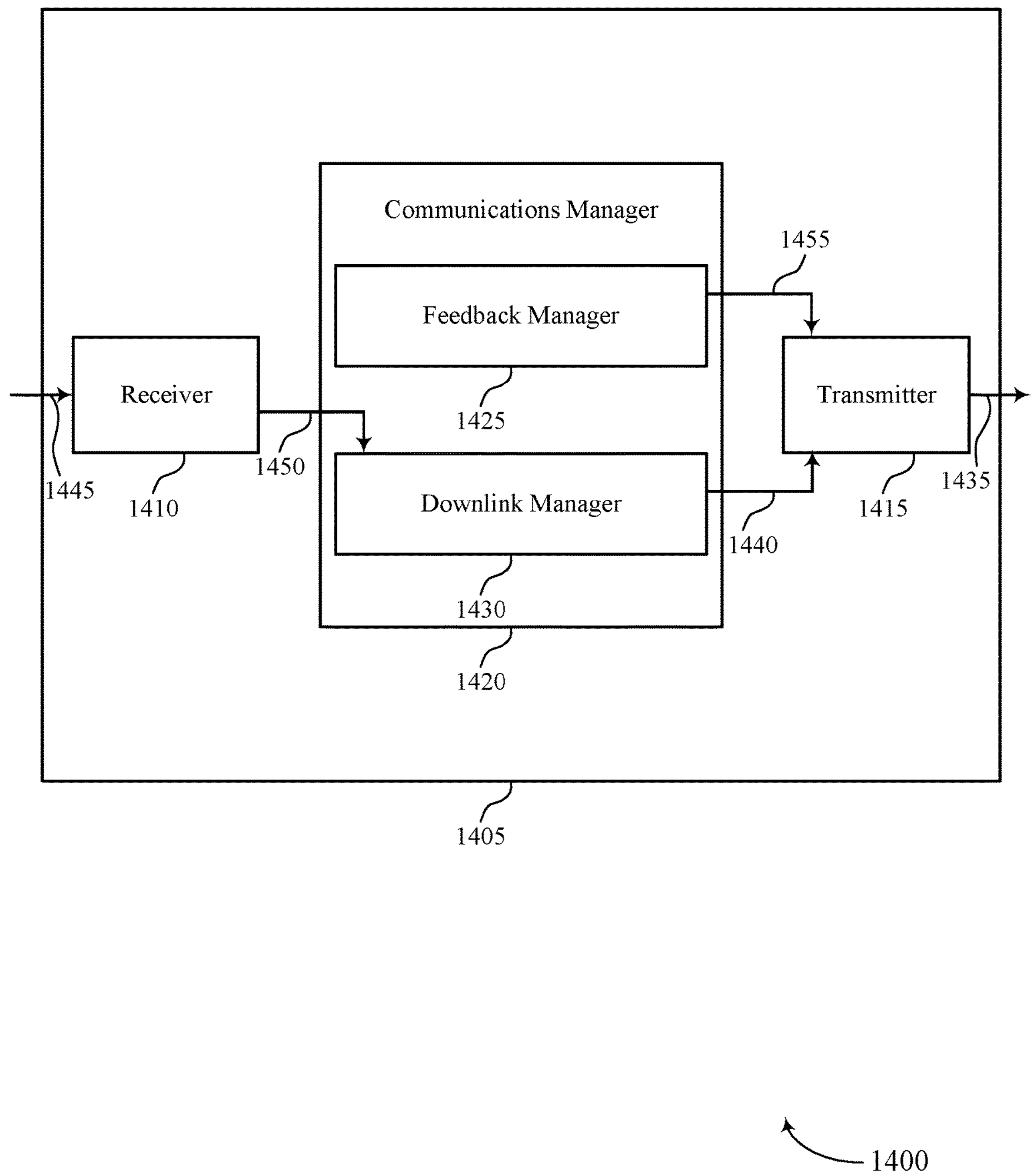

FIG. 14 shows a block diagram 1400 of a device 1405 that supports signaling and reporting multi-bit feedback per TB in accordance with aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to signaling and reporting multi-bit feedback per TB). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to signaling and reporting multi-bit feedback per TB). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of signaling and reporting multi-bit feedback per TB as described herein. For example, the communications manager 1420 may include a feedback manager 1425 a downlink manager 1430, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a base station in accordance with examples as disclosed herein. The feedback manager 1425 may be configured as or otherwise support a means for transmitting, to a UE, signaling 1435/1455 that indicates whether feedback for each of one or more downlink messages scheduled to be received by the UE is to be single-bit feedback or multi-bit feedback. The downlink manager 1430 may be configured as or otherwise support a means for transmitting via signaling 1435/1440 the one or more downlink messages to the UE. The feedback manager 1425 may be configured as or otherwise support a means for receiving a feedback message from the UE via signaling 1445/1450 responsive to the one or more downlink messages, the feedback message reporting the feedback pertaining to each downlink message based on a codebook generated by the UE, the codebook supporting inclusion of both single-bit feedback and multi-bit feedback based on the signaling.

Figure 15:
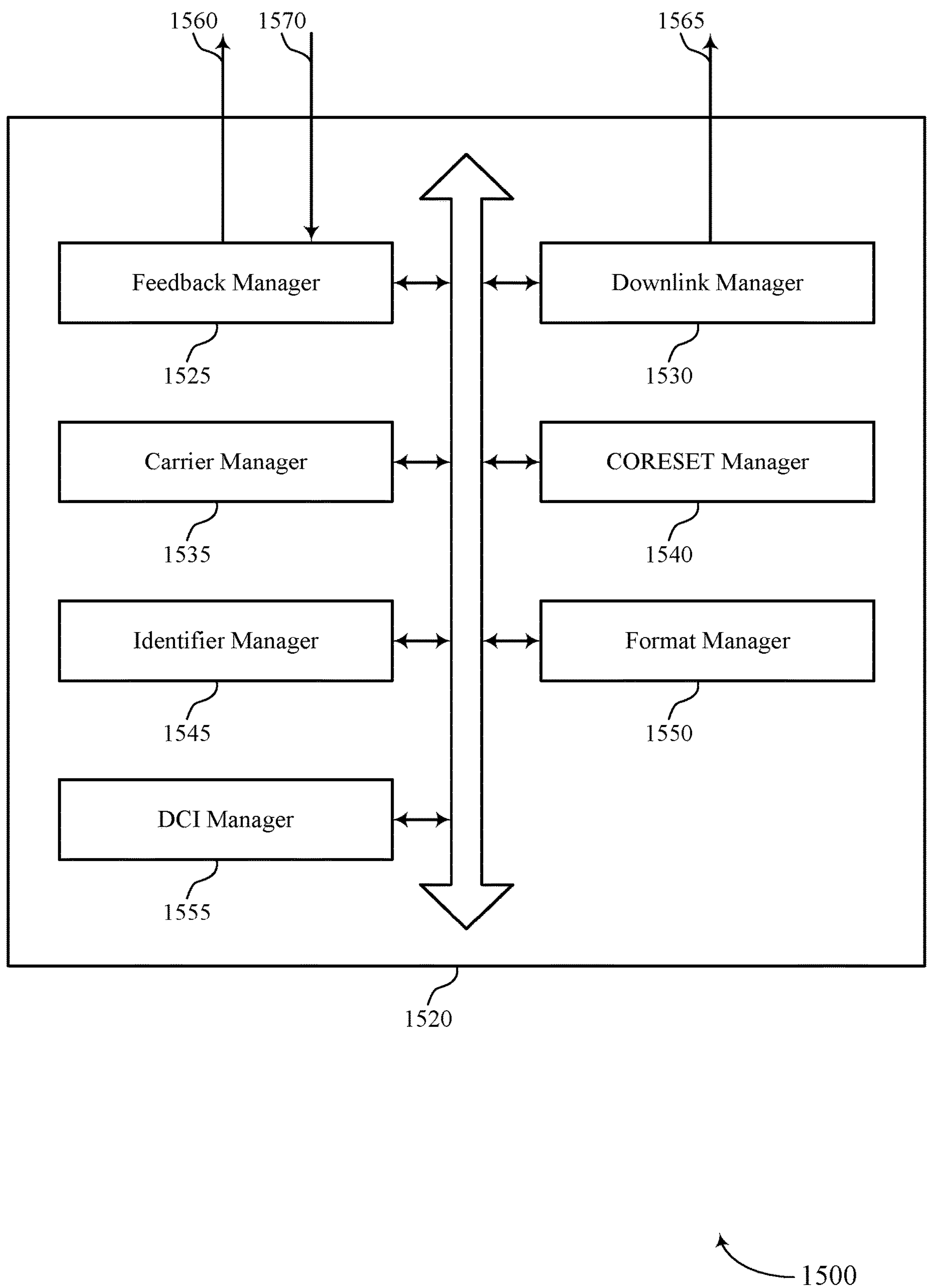
FIG. 15 shows a block diagram of a communications manager that supports signaling and reporting multi-bit feedback per TB in accordance with aspects of the present disclosure.

FIG. 15 shows a block diagram 1500 of a communications manager 1520 that supports signaling and reporting multi-bit feedback per TB in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of signaling and reporting multi-bit feedback per TB as described herein. For example, the communications manager 1520 may include a feedback manager 1525, a downlink manager 1530, a carrier manager 1535, a CORESET manager 1540, an identifier manager 1545, a format manager 1550, a DCI manager 1555, or any combination thereof. Each of these components may communicate, directly or indirectly, with one another (e.g., via one or more buses).

The communications manager 1520 may support wireless communication at a base station in accordance with examples as disclosed herein. The feedback manager 1525 may be configured as or otherwise support a means for transmitting, to a UE, signaling 1560 that indicates whether feedback for each of one or more downlink messages scheduled to be received by the UE is to be single-bit feedback or multi-bit feedback. The downlink manager 1530 may be configured as or otherwise support a means for transmitting the one or more downlink messages to the UE via signaling 1565. In some examples, the feedback manager 1525 may be configured as or otherwise support a means for receiving a feedback message from the UE responsive to the one or more downlink messages via signaling 1570, the feedback message reporting the feedback pertaining to each downlink message based on a codebook generated by the UE, the codebook supporting inclusion of both single-bit feedback and multi-bit feedback based on the signaling.

In some examples, the carrier manager 1535 may be configured as or otherwise support a means for identifying a set of component carriers associated with the one or more downlink messages. In some examples, the carrier manager 1535 may be configured as or otherwise support a means for indicating, in the signaling 1560, whether the feedback is either single-bit feedback or multi-bit feedback on a per-component carrier basis. In some examples, the codebook is generated on a carrier-first then slot second basis or on a slot-first then carrier second basis. In some examples, the multi-bit feedback includes one or more sets of dummy bits in the codebook. In some examples, the signaling includes RRC signaling, a PDCCH message, a DCI grant associated with the one or more downlink messages, or a combination thereof.

In some examples, to support transmitting the signaling, the CORESET manager 1540 may be configured as or otherwise support a means for transmitting the signaling in different control resource sets, where the signaling that is transmitted in a first control resource set is indicative that the UE is to generate a first subsubcodebook that supports inclusion of single-bit feedback for a first subset of downlink messages associated with the signaling that is transmitted in the first control resource set, and where the signaling that is transmitted in a second control resource set is indicative that the UE is to generate a second subsubcodebook that supports inclusion of multi-bit feedback for a second subset of downlink messages associated with the signaling that is transmitted in the second control resource set, the first subset of downlink messages and the second subset of downlink messages being of the one or more downlink messages.

In some examples, to support transmitting the signaling, the identifier manager 1545 may be configured as or otherwise support a means for including one or more identifiers in the signaling, where the codebook supports single-bit feedback based on a first value of the identifier and supports multi-bit feedback based on a second value of the identifier.

In some examples, to support transmitting the signaling, the format manager 1550 may be configured as or otherwise support a means for transmitting the signaling using different formats of a physical downlink control channel message scheduling the one or more downlink messages, where the codebook supports single-bit feedback based on a first format of the physical downlink control channel message and supports multi-bit feedback based on a second format of the physical downlink control channel message.

In some examples, to support transmitting the signaling, the DCI manager 1555 may be configured as or otherwise support a means for including, in each downlink control information of the signaling, a one-bit indicator that indicates whether the codebook is to support single-bit feedback or multi-bit feedback.

Figure 16:
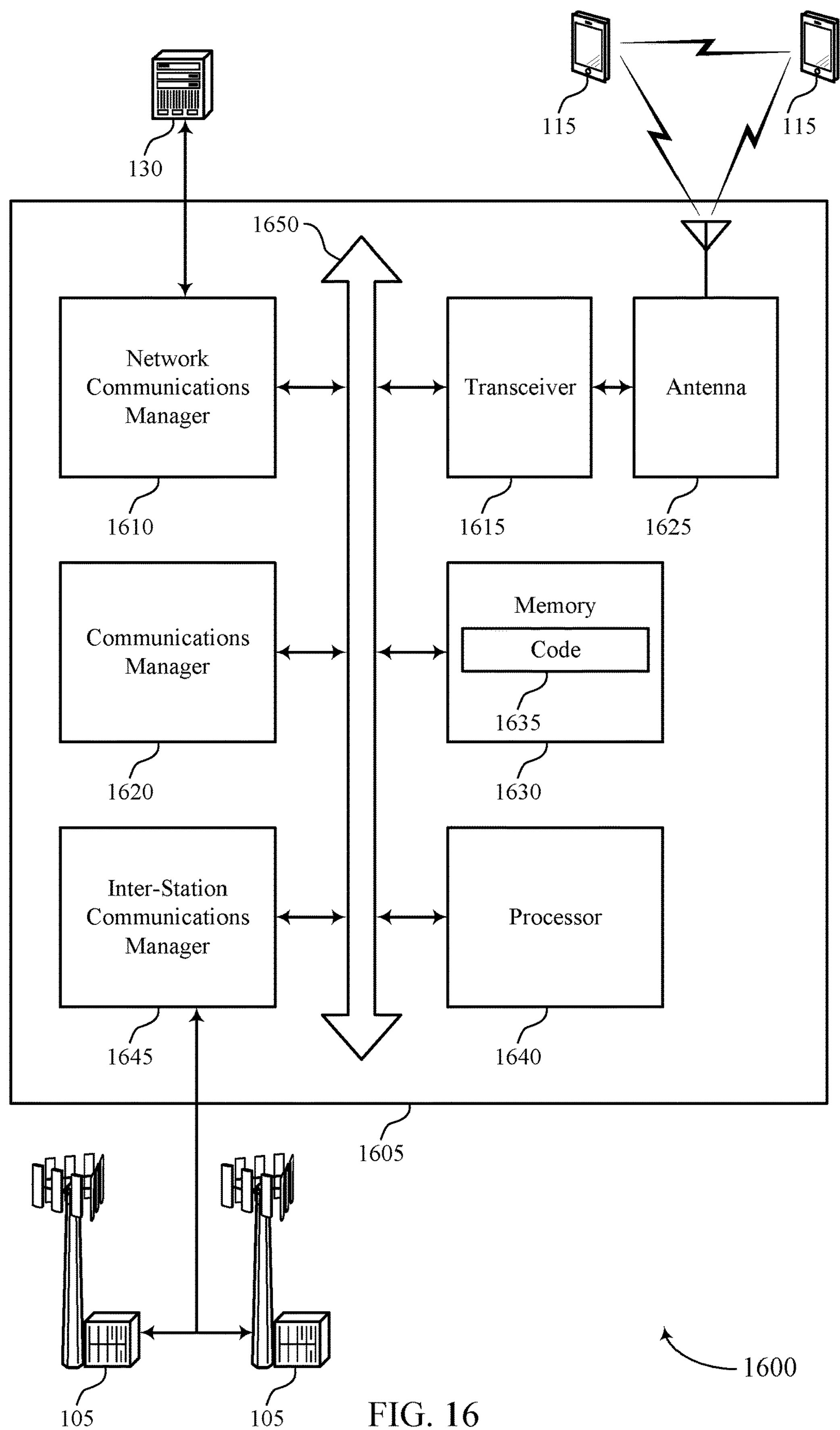
FIG. 16 shows a diagram of a system including a device that supports signaling and reporting multi-bit feedback per TB in accordance with aspects of the present disclosure.

FIG. 16 shows a diagram of a system 1600 including a device 1605 that supports signaling and reporting multi-bit feedback per TB in accordance with aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting signaling and reporting multi-bit feedback per TB). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communication at a base station in accordance with examples as disclosed herein. For example, the communications manager 1620 may be configured as or otherwise support a means for transmitting, to a UE, signaling that indicates whether feedback for each of one or more downlink messages scheduled to be received by the UE is to be single-bit feedback or multi-bit feedback. The communications manager 1620 may be configured as or otherwise support a means for transmitting the one or more downlink messages to the UE. The communications manager 1620 may be configured as or otherwise support a means for receiving a feedback message from the UE responsive to the one or more downlink messages, the feedback message reporting the feedback pertaining to each downlink message based on a codebook generated by the UE, the codebook supporting inclusion of both single-bit feedback and multi-bit feedback based on the signaling.

By including or configuring the communications manager 1620 in accordance with examples as described herein, the device 1605 may support techniques for multiplexing single-bit feedback and multi-bit feedback in a HARQ-ACK codebook based on signaling from a base station.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of signaling and reporting multi-bit feedback per TB as described herein, or the processor 1640 and the memory 1630 may be otherwise configured to perform or support such operations.

Figure 17:
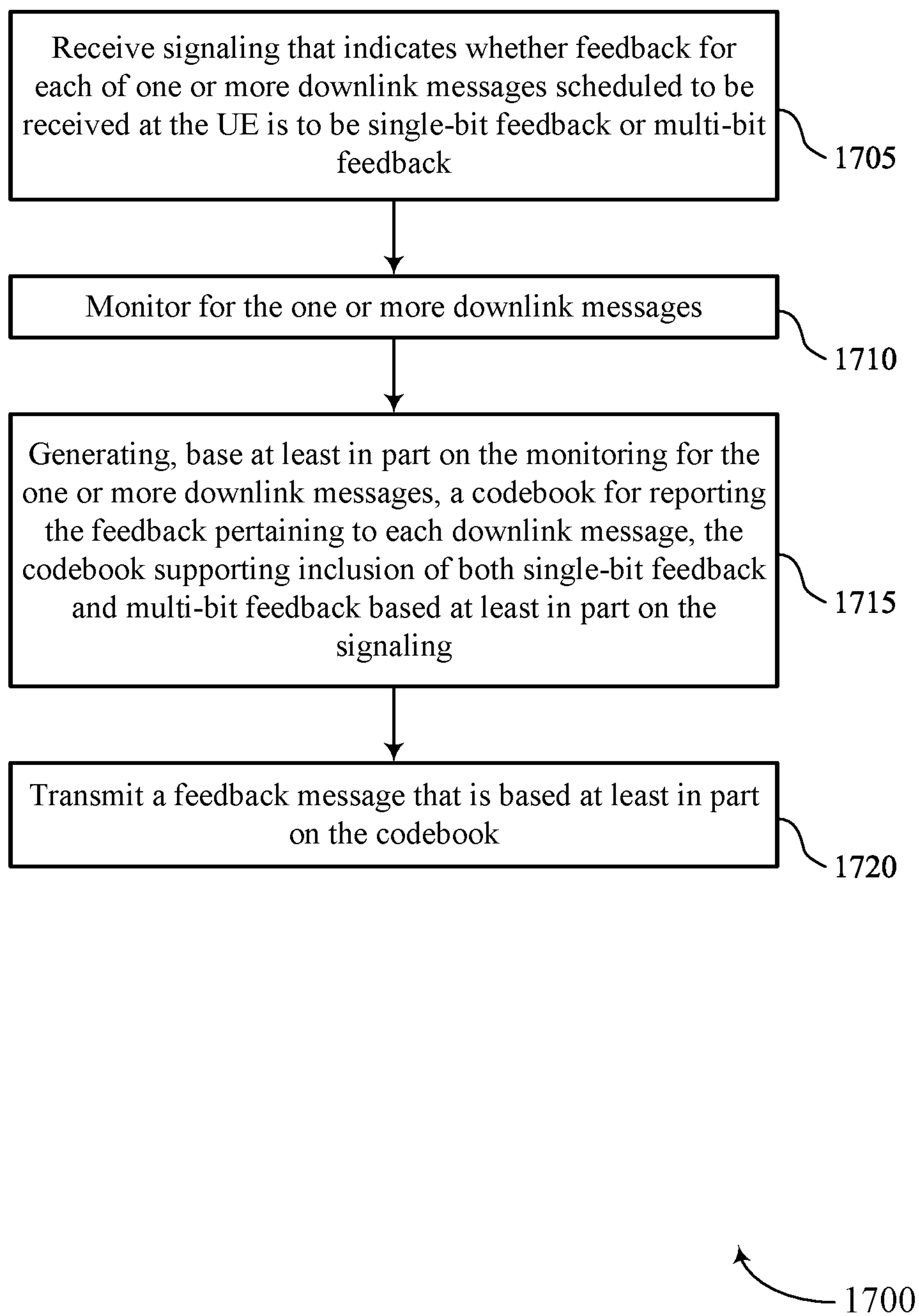
FIGS. 17 through 21 show flowcharts illustrating methods that support signaling and reporting multi-bit feedback per TB in accordance with aspects of the present disclosure.

FIG. 17 shows a flowchart illustrating a method 1700 that supports signaling and reporting multi-bit feedback per TB in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1705, the method may include receiving signaling that indicates whether feedback for each of one or more downlink messages scheduled to be received at the UE is to be single-bit feedback or multi-bit feedback. The operations of 1705 may be performed in accordance with examples as disclosed herein. In some examples, aspects of the operations of 1705 may be performed by a feedback manager 1125 as described with reference to FIG. 11.

At 1710, the method may include monitoring for the one or more downlink messages. The operations of 1710 may be performed in accordance with examples as disclosed herein. In some examples, aspects of the operations of 1710 may be performed by a downlink manager 1130 as described with reference to FIG. 11.

At 1715, the method may include generating, based on the monitoring for the one or more downlink messages, a codebook for reporting the feedback pertaining to each downlink message, the codebook supporting inclusion of both single-bit feedback and multi-bit feedback based on the signaling. The operations of 1715 may be performed in accordance with examples as disclosed herein. In some examples, aspects of the operations of 1715 may be performed by a codebook manager 1135 as described with reference to FIG. 11.

At 1720, the method may include transmitting a feedback message that is based on the codebook. The operations of 1720 may be performed in accordance with examples as disclosed herein. In some examples, aspects of the operations of 1720 may be performed by a feedback manager 1125 as described with reference to FIG. 11.

Figure 18:
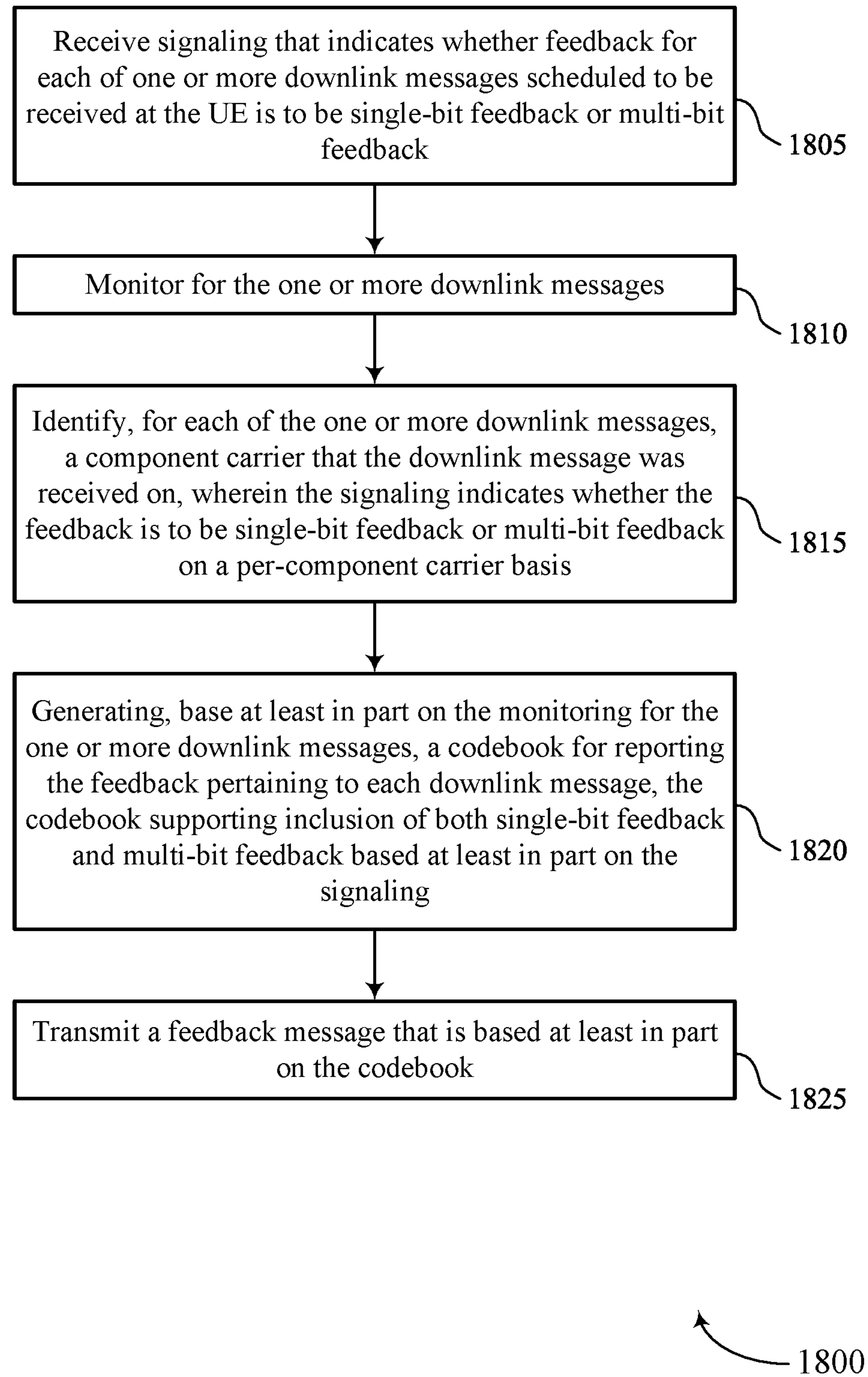

FIG. 18 shows a flowchart illustrating a method 1800 that supports signaling and reporting multi-bit feedback per TB in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1805, the method may include receiving signaling that indicates whether feedback for each of one or more downlink messages scheduled to be received at the UE is to be single-bit feedback or multi-bit feedback. The operations of 1805 may be performed in accordance with examples as disclosed herein. In some examples, aspects of the operations of 1805 may be performed by a feedback manager 1125 as described with reference to FIG. 11.

At 1810, the method may include monitoring for the one or more downlink messages. The operations of 1810 may be performed in accordance with examples as disclosed herein. In some examples, aspects of the operations of 1810 may be performed by a downlink manager 1130 as described with reference to FIG. 11.

At 1815, the method may include identifying, for each of the one or more downlink messages, a component carrier that the downlink message was received on, where the signaling indicates whether the feedback is to be single-bit feedback or multi-bit feedback on a per-component carrier basis. The operations of 1815 may be performed in accordance with examples as disclosed herein. In some examples, aspects of the operations of 1815 may be performed by a carrier manager 1140 as described with reference to FIG. 11.

At 1820, the method may include generating, based on the monitoring for the one or more downlink messages, a codebook for reporting the feedback pertaining to each downlink message, the codebook supporting inclusion of both single-bit feedback and multi-bit feedback based on the signaling. The operations of 1820 may be performed in accordance with examples as disclosed herein. In some examples, aspects of the operations of 1820 may be performed by a codebook manager 1135 as described with reference to FIG. 11.

At 1825, the method may include transmitting a feedback message that is based on the codebook. The operations of 1825 may be performed in accordance with examples as disclosed herein. In some examples, aspects of the operations of 1825 may be performed by a feedback manager 1125 as described with reference to FIG. 11.

Figure 19:
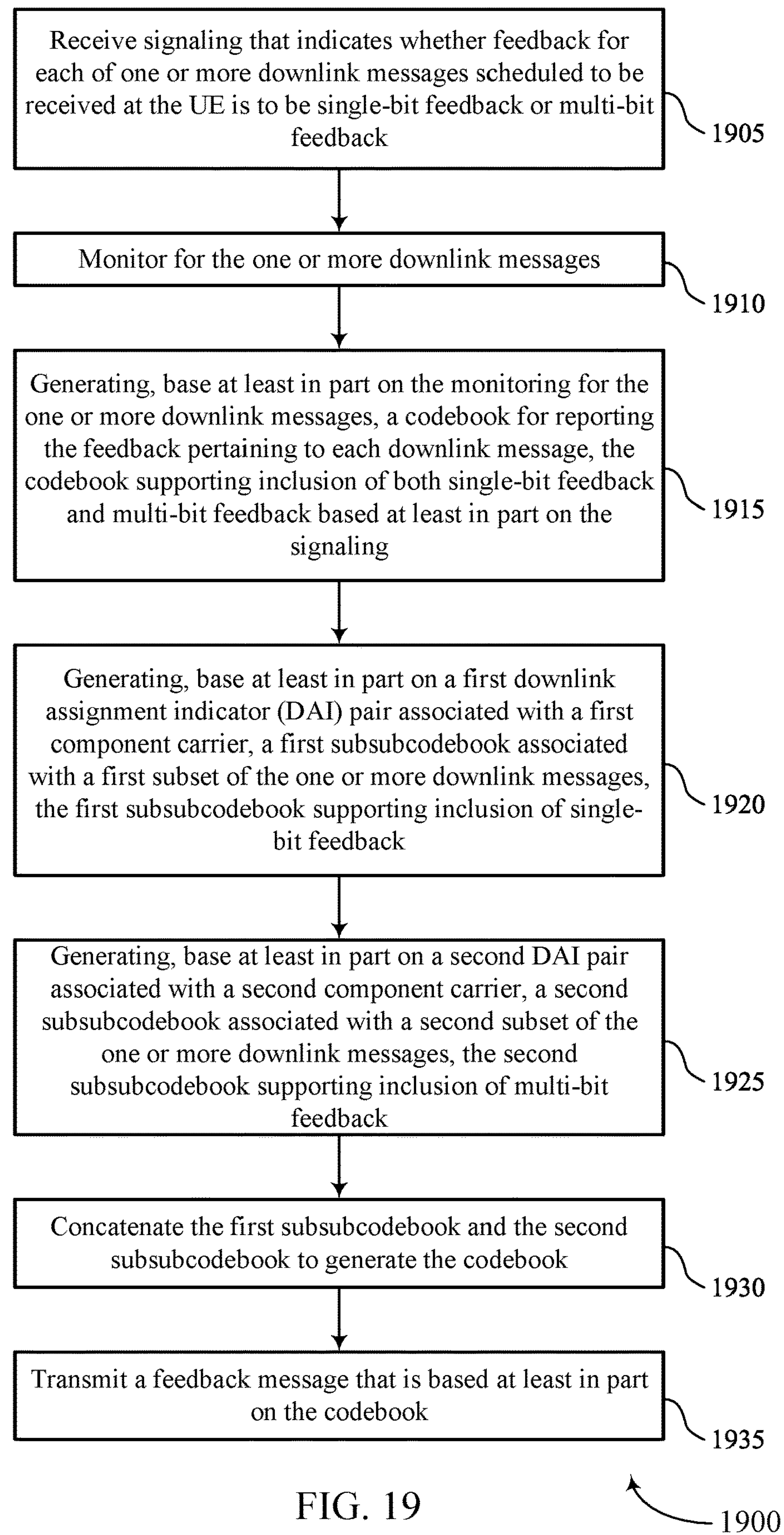

FIG. 19 shows a flowchart illustrating a method 1900 that supports signaling and reporting multi-bit feedback per TB in accordance with aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1905, the method may include receiving signaling that indicates whether feedback for each of one or more downlink messages scheduled to be received at the UE is to be single-bit feedback or multi-bit feedback. The operations of 1905 may be performed in accordance with examples as disclosed herein. In some examples, aspects of the operations of 1905 may be performed by a feedback manager 1125 as described with reference to FIG. 11.

At 1910, the method may include monitoring for the one or more downlink messages. The operations of 1910 may be performed in accordance with examples as disclosed herein. In some examples, aspects of the operations of 1910 may be performed by a downlink manager 1130 as described with reference to FIG. 11.

At 1915, the method may include generating, based on the monitoring for the one or more downlink messages, a codebook for reporting the feedback pertaining to each downlink message, the codebook supporting inclusion of both single-bit feedback and multi-bit feedback based on the signaling. The operations of 1915 may be performed in accordance with examples as disclosed herein. In some examples, aspects of the operations of 1915 may be performed by a codebook manager 1135 as described with reference to FIG. 11.

At 1920, the method may include generating, based on a first downlink assignment indicator (DAI) pair associated with a first component carrier, a first sub subcodebook associated with a first subset of the one or more downlink messages, the first subsubcodebook supporting inclusion of single-bit feedback. The operations of 1920 may be performed in accordance with examples as disclosed herein. In some examples, aspects of the operations of 1920 may be performed by a DAI manager 1145 as described with reference to FIG. 11.

At 1925, the method may include generating, based on a second DAI pair associated with a second component carrier, a second subsubcodebook associated with a second subset of the one or more downlink messages, the second subsubcodebook supporting inclusion of multi-bit feedback. The operations of 1925 may be performed in accordance with examples as disclosed herein. In some examples, aspects of the operations of 1925 may be performed by a DAI manager 1145 as described with reference to FIG. 11.

At 1930, the method may include concatenating the first subsubcodebook and the second subsubcodebook to generate the codebook. The operations of 1930 may be performed in accordance with examples as disclosed herein. In some examples, aspects of the operations of 1930 may be performed by a DAI manager 1145 as described with reference to FIG. 11.

At 1935, the method may include transmitting a feedback message that is based on the codebook. The operations of 1935 may be performed in accordance with examples as disclosed herein. In some examples, aspects of the operations of 1935 may be performed by a feedback manager 1125 as described with reference to FIG. 11.

Figure 20:
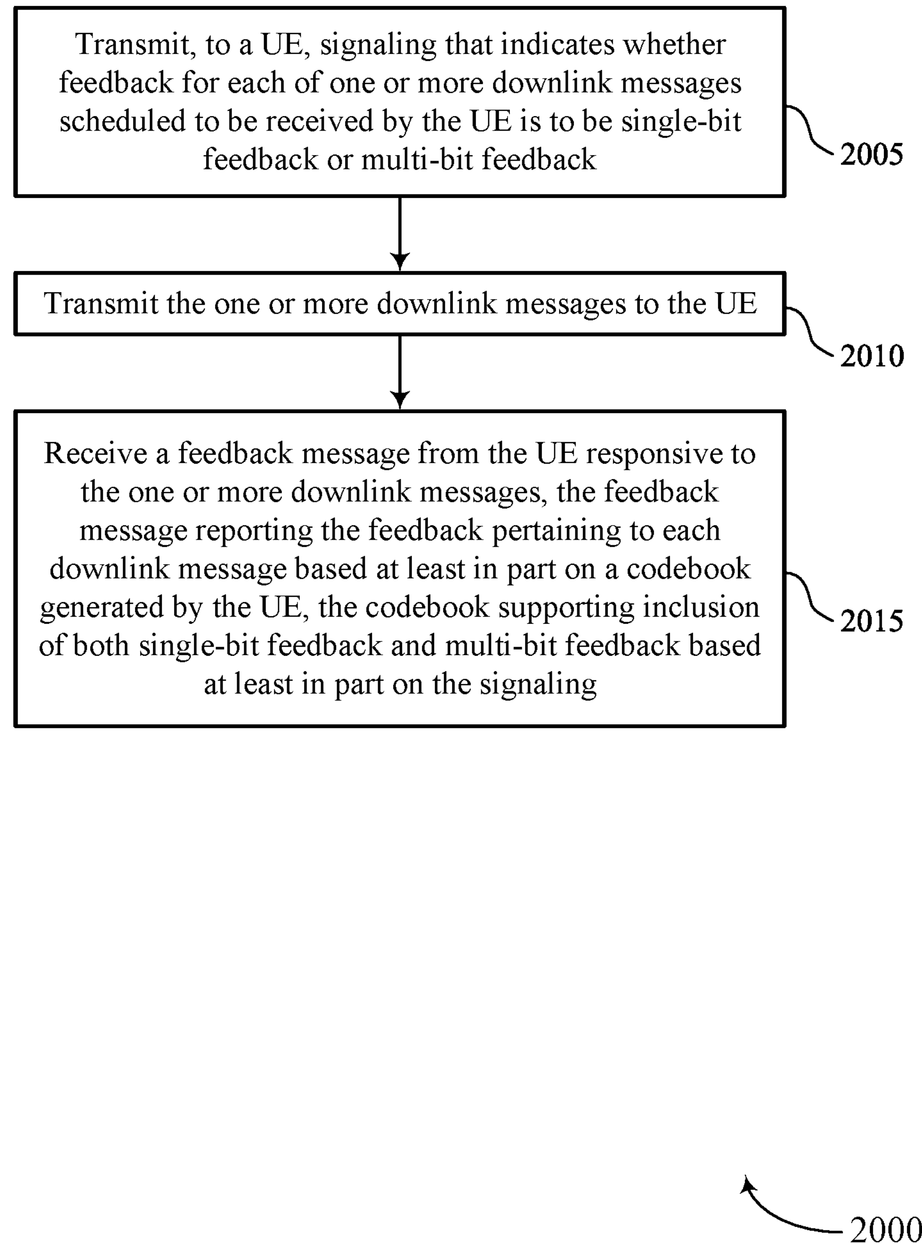

FIG. 20 shows a flowchart illustrating a method 2000 that supports signaling and reporting multi-bit feedback per TB in accordance with aspects of the present disclosure. The operations of the method 2000 may be implemented by a base station or its components as described herein. For example, the operations of the method 2000 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, signaling that indicates whether feedback for each of one or more downlink messages scheduled to be received by the UE is to be single-bit feedback or multi-bit feedback. The operations of 2005 may be performed in accordance with examples as disclosed herein. In some examples, aspects of the operations of 2005 may be performed by a feedback manager 1525 as described with reference to FIG. 15.

At 2010, the method may include transmitting the one or more downlink messages to the UE. The operations of 2010 may be performed in accordance with examples as disclosed herein. In some examples, aspects of the operations of 2010 may be performed by a downlink manager 1530 as described with reference to FIG. 15.

At 2015, the method may include receiving a feedback message from the UE responsive to the one or more downlink messages, the feedback message reporting the feedback pertaining to each downlink message based on a codebook generated by the UE, the codebook supporting inclusion of both single-bit feedback and multi-bit feedback based on the signaling. The operations of 2015 may be performed in accordance with examples as disclosed herein. In some examples, aspects of the operations of 2015 may be performed by a feedback manager 1525 as described with reference to FIG. 15.

Figure 21:
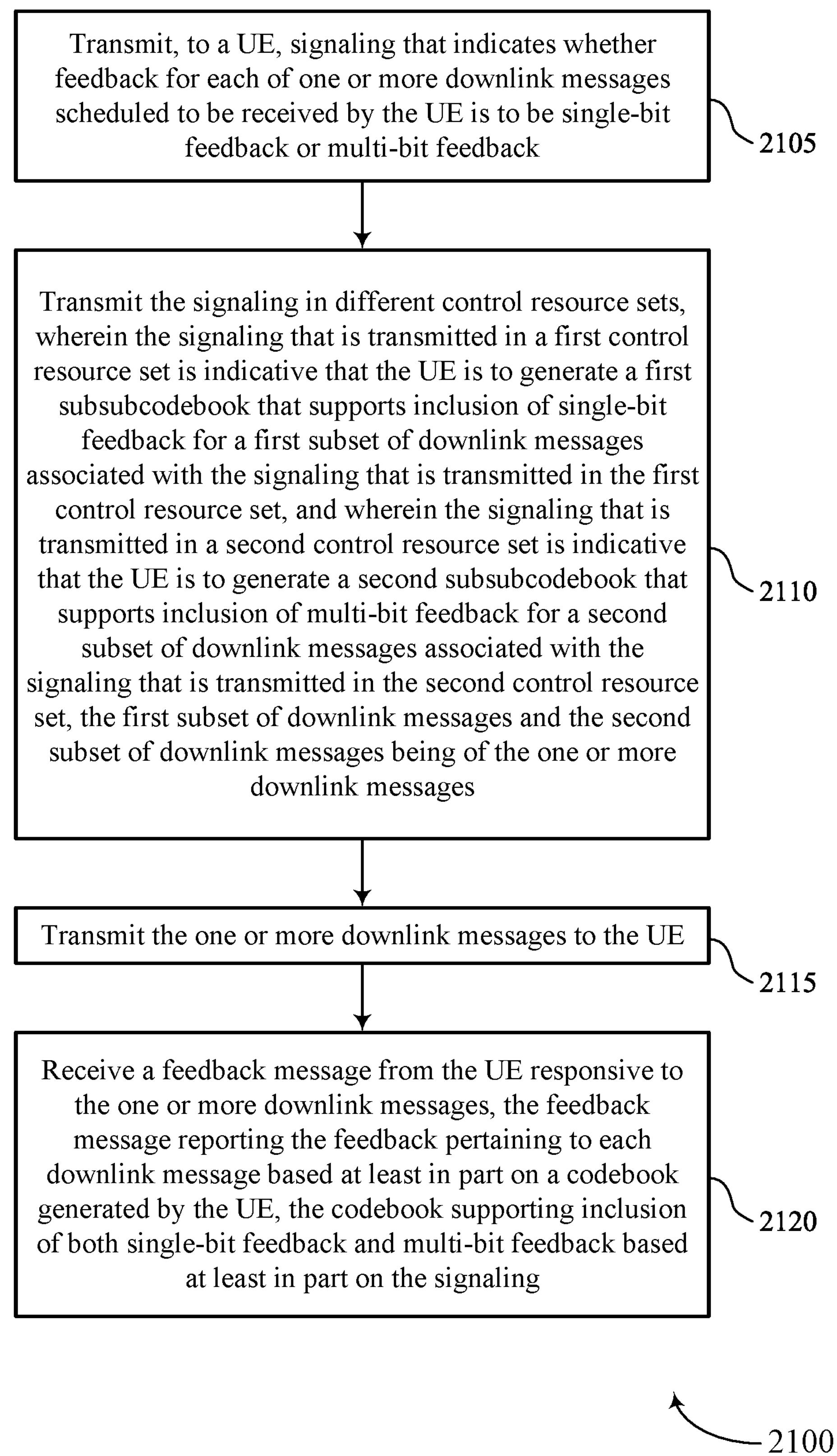

FIG. 21 shows a flowchart illustrating a method 2100 that supports signaling and reporting multi-bit feedback per TB in accordance with aspects of the present disclosure. The operations of the method 2100 may be implemented by a base station or its components as described herein. For example, the operations of the method 2100 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2105, the method may include transmitting, to a UE, signaling that indicates whether feedback for each of one or more downlink messages scheduled to be received by the UE is to be single-bit feedback or multi-bit feedback. The operations of 2105 may be performed in accordance with examples as disclosed herein. In some examples, aspects of the operations of 2105 may be performed by a feedback manager 1525 as described with reference to FIG. 15.

At 2110, the method may include transmitting the signaling in different control resource sets, where the signaling that is transmitted in a first control resource set is indicative that the UE is to generate a first subsubcodebook that supports inclusion of single-bit feedback for a first subset of downlink messages associated with the signaling that is transmitted in the first control resource set, and where the signaling that is transmitted in a second control resource set is indicative that the UE is to generate a second subsubcodebook that supports inclusion of multi-bit feedback for a second subset of downlink messages associated with the signaling that is transmitted in the second control resource set, the first subset of downlink messages and the second subset of downlink messages being of the one or more downlink messages. The operations of 2110 may be performed in accordance with examples as disclosed herein. In some examples, aspects of the operations of 2110 may be performed by a CORESET manager 1540 as described with reference to FIG. 15.

At 2115, the method may include transmitting the one or more downlink messages to the UE. The operations of 2115 may be performed in accordance with examples as disclosed herein. In some examples, aspects of the operations of 2115 may be performed by a downlink manager 1530 as described with reference to FIG. 15.

At 2120, the method may include receiving a feedback message from the UE responsive to the one or more downlink messages, the feedback message reporting the feedback pertaining to each downlink message based on a codebook generated by the UE, the codebook supporting inclusion of both single-bit feedback and multi-bit feedback based on the signaling. The operations of 2120 may be performed in accordance with examples as disclosed herein. In some examples, aspects of the operations of 2120 may be performed by a feedback manager 1525 as described with reference to FIG. 15.

The following provides an overview of aspects of the present disclosure:

Aspect 1: A method for wireless communication at a UE, comprising: receiving signaling that indicates whether feedback for each of one or more downlink messages scheduled to be received at the UE is to be single-bit feedback or multi-bit feedback; monitoring for the one or more downlink messages; generating, based at least in part on the monitoring for the one or more downlink messages, a codebook for reporting the feedback pertaining to each downlink message, the codebook supporting inclusion of both single-bit feedback and multi-bit feedback based at least in part on the signaling; and transmitting a feedback message that is based at least in part on the codebook.

Aspect 2: The method of aspect 1, further comprising: identifying, for each of the one or more downlink messages, a component carrier that the downlink message was received on, wherein the signaling indicates whether the feedback is to be single-bit feedback or multi-bit feedback on a per-component carrier basis.

Aspect 3: The method of aspect 2, wherein the UE generates the codebook on a carrier-first then slot-second basis or on a slot-first then carrier-second basis.

Aspect 4: The method of any of aspects 2 through 3, wherein the multi-bit feedback comprises one or more sets of multiple dummy bits in the codebook; and each set of multiple dummy bits corresponds to a potential downlink message.

Aspect 5: The method of any of aspects 1 through 4, further comprising: generating, based at least in part on a first DAI pair associated with a first component carrier, a first subsubcodebook associated with a first subset of the one or more downlink messages, the first subsubcodebook supporting inclusion of single-bit feedback; generating, based at least in part on a second DAI pair associated with a second component carrier, a second subsubcodebook associated with a second subset of the one or more downlink messages, the second subsubcodebook supporting inclusion of multi-bit feedback; and concatenating the first subsubcodebook and the second subsubcodebook to generate the codebook.

Aspect 6: The method of any of aspects 1 through 5, further comprising: generating a first subsubcodebook associated with a first subset of the one or more downlink messages whose feedback is indicated as being single-bit feedback; generating a second subsubcodebook associated with a second subset of the one or more downlink messages whose feedback is indicated as being multi-bit feedback; and concatenating the first subsubcodebook and the second subsubcodebook to generate the codebook.

Aspect 7: The method of any of aspects 1 through 6, further comprising: determining, based at least in part on the signaling, that at least one component carrier of a set of component carriers configured for the one or more downlink messages uses multi-bit feedback; and generating the codebook using multi-bit feedback for each component carrier in the set of component carriers based at least in part on the at least one component carrier using multi-bit feedback.

Aspect 8: The method of any of aspects 1 through 7, further comprising: determining a control resource set identifier associated with a PDCCH message scheduling the one or more downlink messages, wherein the codebook is generated to support single-bit feedback based at least in part on a first control resource set identifier and to support multi-bit feedback based at least in part on a second control resource set identifier.

Aspect 9: The method of any of aspects 1 through 8, further comprising: generating, for each monitoring occasion associated with the one or more downlink messages, a first subcodebook that supports inclusion of single-bit feedback; generating, for each monitoring occasion associated with the one or more downlink messages, a second subcodebook that supports inclusion of multi-bit feedback; and concatenating the first subcodebook and the second subcodebook to generate the codebook.

Aspect 10: The method of any of aspects 1 through 9, further comprising: generating, based at least in part on monitoring a first control resource set, a first subsubcodebook that supports inclusion of single-bit feedback for a first subset of downlink messages of the one or more downlink messages; generating, based at least in part on monitoring a second control resource set, a second subsubcodebook that supports inclusion of multi-bit feedback for a second subset of downlink messages of the one or more downlink messages; and concatenating the first subcodebook and the second subcodebook to generate the codebook.

Aspect 11: The method of any of aspects 1 through 10, further comprising: determining an identifier associated with a PDCCH message scheduling the one or more downlink messages, wherein the codebook is generated to support single-bit feedback based at least in part on a first value of the identifier and to support multi-bit feedback based at least in part on a second value of the identifier.

Aspect 12: The method of any of aspects 1 through 11, further comprising: determining a format of a PDCCH message scheduling the one or more downlink messages, wherein the codebook is generated to support single-bit feedback based at least in part on a first format of the PDCCH message and to support multi-bit feedback based at least in part on a second format of the PDCCH message.

Aspect 13: The method of any of aspects 1 through 12, further comprising: determining, for each monitoring occasion associated with the one or more downlink messages, whether the feedback is to be single-bit feedback or multi-bit feedback based at least in part on a single bit indicated in a DCI scheduling the respective monitoring occasion.

Aspect 14: A method for wireless communication at a base station, comprising: transmitting, to a UE, signaling that indicates whether feedback for each of one or more downlink messages scheduled to be received by the UE is to be single-bit feedback or multi-bit feedback; transmitting the one or more downlink messages to the UE; and receiving a feedback message from the UE responsive to the one or more downlink messages, the feedback message reporting the feedback pertaining to each downlink message based at least in part on a codebook generated by the UE, the codebook supporting inclusion of both single-bit feedback and multi-bit feedback based at least in part on the signaling.

Aspect 15: The method of aspect 14, further comprising: identifying a set of component carriers associated with the one or more downlink messages; and indicating, in the signaling, whether the feedback is either single-bit feedback or multi-bit feedback on a per-component carrier basis.

Aspect 16: The method of aspect 15, wherein the codebook is generated on a carrier-first then slot second basis or on a slot-first then carrier second basis.

Aspect 17: The method of any of aspects 15 through 16, wherein the multi-bit feedback comprises one or more sets of dummy bits in the codebook.

Aspect 18: The method of any of aspects 14 through 17, wherein the signaling comprises RRC signaling, a PDCCH message, a DCI grant associated with the one or more downlink messages, or a combination thereof.

Aspect 19: The method of any of aspects 14 through 18, wherein transmitting the signaling further comprises: transmitting the signaling in different control resource sets, wherein the signaling that is transmitted in a first control resource set is indicative that the UE is to generate a first subsubcodebook that supports inclusion of single-bit feedback for a first subset of downlink messages associated with the signaling that is transmitted in the first control resource set, and wherein the signaling that is transmitted in a second control resource set is indicative that the UE is to generate a second subsubcodebook that supports inclusion of multi-bit feedback for a second subset of downlink messages associated with the signaling that is transmitted in the second control resource set, the first subset of downlink messages and the second subset of downlink messages being of the one or more downlink messages.

Aspect 20: The method of any of aspects 14 through 19, wherein transmitting the signaling further comprises:

including one or more identifiers in the signaling, wherein the codebook supports single-bit feedback based at least in part on a first value of the identifier and supports multi-bit feedback based at least in part on a second value of the identifier.

Aspect 21: The method of any of aspects 14 through 20, wherein transmitting the signaling further comprises: transmitting the signaling using different formats of a PDCCH message scheduling the one or more downlink messages, wherein the codebook supports single-bit feedback based at least in part on a first format of the PDCCH message and supports multi-bit feedback based at least in part on a second format of the PDCCH message.

Aspect 22: The method of any of aspects 14 through 21, wherein transmitting the signaling further comprises: including, in each DCI of the signaling, a one-bit indicator that indicates whether the codebook is to support single-bit feedback or multi-bit feedback.

Aspect 23: An apparatus for wireless communication at a UE, comprising a processor; memory coupled with the processor; and instructions stored in the memory and executable by the processor to cause the apparatus to perform a method of any of aspects 1 through 13.

Aspect 24: An apparatus for wireless communication at a UE, comprising at least one means for performing a method of any of aspects 1 through 13.

Aspect 25: A non-transitory computer-readable medium storing code for wireless communication at a UE, the code comprising instructions executable by a processor to perform a method of any of aspects 1 through 13.

Aspect 26: An apparatus for wireless communication at a base station, comprising a processor; memory coupled with the processor; and instructions stored in the memory and executable by the processor to cause the apparatus to perform a method of any of aspects 14 through 22.

Aspect 27: An apparatus for wireless communication at a base station, comprising at least one means for performing a method of any of aspects 14 through 22.

Aspect 28: A non-transitory computer-readable medium storing code for wireless communication at a base station, the code comprising instructions executable by a processor to perform a method of any of aspects 14 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. As used herein, the phrase “based on” shall be construed in the same manner as the phrase “based at least in part on.”

The term “determine” or “determining” encompasses a wide variety of actions and, therefore, “determining” can include calculating, computing, processing, deriving, investigating, looking up (such as via looking up in a table, a database or another data structure), ascertaining and the like. Also, “determining” can include receiving (such as receiving information), accessing (such as accessing data in a memory) and the like. Also, “determining” can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term “example” used herein means “serving as an example, instance, or illustration,” and not “preferred” or “advantageous over other examples.” The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:

a processor; and memory coupled with the processor, wherein the processor is configured to cause the apparatus to:

receive signaling that indicates whether feedback for each of one or more downlink messages scheduled to be received at the apparatus is to be single-bit feedback or multi-bit feedback;

monitor for the one or more downlink messages;

generate, based at least in part on the monitoring for the one or more downlink messages, a codebook for reporting the feedback pertaining to each downlink message, wherein the codebook supports inclusion of both single-bit feedback and multi-bit feedback based at least in part on the signaling; and transmit a feedback message that is based at least in part on the codebook, wherein:

first multi-bit feedback comprises one or more sets of multiple dummy bits in the codebook, and each set of multiple dummy bits corresponds to a potential downlink message;

the codebook includes a first subsubcodebook concatenated with a second subsubcodebook;

the codebook supports inclusion of single-bit feedback or multi-bit feedback based at least in part on an identifier associated with a first physical downlink control channel message scheduling a first downlink message of the one or more downlink messages; or the codebook supports inclusion of single-bit feedback or multi-bit feedback based at least in part on a format of a second physical downlink control channel message scheduling a second downlink message of the one or more downlink messages.

2. The apparatus of claim 1, wherein the signaling indicates whether the feedback is to be single-bit feedback or multi-bit feedback on a per-component carrier basis.

3. The apparatus of claim 2, wherein, to generate the codebook, the processor is configured to generate the codebook on a carrier-first then slot-second basis or on a slot-first then carrier-second basis.

4. The apparatus of claim 2, wherein:

the first multi-bit feedback comprises the one or more sets of multiple dummy bits in the codebook.

5. The apparatus of claim 1, wherein the codebook includes the first subsubcodebook concatenated with the second subsubcodebook.

6. The apparatus of claim 5, wherein:

the first subsubcodebook is associated with a first subset of the one or more downlink messages whose feedback is indicated as being single-bit feedback; and the second subsubcodebook is associated with a second subset of the one or more downlink messages whose feedback is indicated as being multi-bit feedback.

7. The apparatus of claim 5, the processor is configured to cause the apparatus to:

generate, for each monitor occasion associated with the one or more downlink messages, the first subsubcodebook that supports inclusion of single-bit feedback; and generate, for each monitor occasion associated with the one or more downlink messages, the second subsubcodebook that supports inclusion of multi-bit feedback.

8. The apparatus of claim 5, wherein the first subsubcodebook is based at least in part on a first control resource set, and wherein the first subsubcodebook supports inclusion of single-bit feedback for a first subset of downlink messages of the one or more downlink messages; and wherein the second subsubcodebook is based at least in part on a second control resource set, and wherein the second subsubcodebook supports inclusion of multi-bit feedback for a second subset of downlink messages of the one or more downlink messages.

9. The apparatus of claim 5, wherein the first subsubcodebook is based at least in part on a first downlink assignment indicator (DAI) pair associated with a first component carrier, wherein the first subsubcodebook is associated with a first subset of the one or more downlink messages, and wherein the first subsubcodebook supports inclusion of single-bit feedback; and wherein the second subsubcodebook is based at least in part on a second DAI pair associated with a second component carrier, wherein the second subsubcodebook is associated with a second subset of the one or more downlink messages, and wherein the second subsubcodebook supports inclusion of multi-bit feedback.

10. The apparatus of claim 1, wherein the processor is configured to cause the apparatus to:

receive second signaling that indicates whether feedback for each downlink message of a plurality of downlink messages scheduled to be received at the apparatus is to be single-bit feedback or multi-bit feedback;

determine, based at least in part on the second signaling, that at least one component carrier of a set of component carriers configured for the plurality of downlink messages uses multi-bit feedback;

generate a second codebook using multi-bit feedback for each component carrier in the set of component carriers based at least in part on the at least one component carrier using multi-bit feedback; and transmit a second feedback message that is based at least in part on the second codebook.

11. The apparatus of claim 1, wherein the codebook supports inclusion of single-bit feedback or multi-bit feedback based at least in part on the identifier associated with the first physical downlink control channel message scheduling the first downlink message of the one or more downlink messages.

12. The apparatus of claim 11, wherein, to generate the codebook, the processor is configured to cause the apparatus to:

generate the codebook to support single-bit feedback based at least in part on a first value of the identifier and to support multi-bit feedback based at least in part on a second value of the identifier.

13. The apparatus of claim 11, wherein the identifier is a control resource set identifier.

14. The apparatus of claim 13, wherein the control resource set identifier is a first control resource set identifier or a second control resource set identifier, and wherein, to generate the codebook, the processor is configured to cause the apparatus to:

generate the codebook to support single-bit feedback based at least in part on the first control resource set identifier; or generate the codebook to support multi-bit feedback based at least in part on the second control resource set identifier.

15. The apparatus of claim 1, wherein the codebook supports inclusion of single-bit feedback or multi-bit feedback based at least in part on the format of the second physical downlink control channel message scheduling the second downlink message of the one or more downlink messages.

16. The apparatus of claim 15, wherein the format is a first format or a second format, and wherein, to generate the codebook, the processor is configured to cause the apparatus to:

generate the codebook to support single-bit feedback based at least in part on the first format of the second physical downlink control channel message; or generate the codebook to support multi-bit feedback based at least in part on the second format of the second physical downlink control channel message.

17. The apparatus of claim 1, wherein the processor is configured to cause the apparatus to:

receive second signaling that indicates whether feedback for each downlink message of a plurality of downlink messages scheduled to be received at the apparatus is to be single-bit feedback or multi-bit feedback;

determine, for each monitoring occasion associated with the plurality of downlink messages, whether the feedback is to be single-bit feedback or multi-bit feedback based at least in part on a single bit indicated in a downlink control information scheduling the respective monitoring occasion;

generate, based at least in part on the monitoring for the plurality of downlink messages, a second codebook for reporting the feedback pertaining to each downlink message of the plurality of downlink messages; and transmit a second feedback message that is based at least in part on the second codebook.

18. An apparatus for wireless communication, comprising:

a processor;

memory coupled with the processor, wherein the processor is configured to cause the apparatus to:

transmit, to a user equipment (UE), signaling that indicates whether feedback for each of one or more downlink messages scheduled to be received by the UE is to be single-bit feedback or multi-bit feedback;

transmit the one or more downlink messages to the UE; and receive a feedback message from the UE responsive to the one or more downlink messages, the feedback message reporting the feedback pertaining to each downlink message based at least in part on a codebook, the codebook supporting inclusion of both single-bit feedback and multi-bit feedback based at least in part on the signaling, wherein first multi-bit feedback comprises one or more sets of multiple dummy bits in the codebook, and wherein each set of multiple dummy bits corresponds to a potential downlink message;

wherein, to transmit the signaling, the processor is configured to cause the apparatus to transmit the signaling in different control resource sets, wherein a first control resource set of the different control resource sets is indicative that a first subsubcodebook is to be generated that supports inclusion of single-bit feedback for a first subset of downlink messages associated with the signaling that is transmitted in the first control resource set, wherein a second control resource set of the different control resource sets is indicative that a second subsubcodebook is to be generated that supports inclusion of multi-bit feedback for a second subset of downlink messages associated with the signaling that is transmitted in the second control resource set, and wherein the one or more downlink messages include the first subset of downlink messages and the second subset of downlink messages; or wherein, to transmit the signaling, the processor is configured to cause the apparatus to transmit the signaling using a first format or a second format of a physical downlink control channel message scheduling a first downlink message of the one or more downlink messages, and wherein the codebook supports single-bit feedback based at least in part on the first format of the first physical downlink control channel message and supports multi-bit feedback based at least in part on the second format of the first physical downlink control channel message.

19. The apparatus of claim 18, wherein the signaling indicates whether the feedback is either single-bit feedback or multi-bit feedback on a per-component carrier basis.

20. The apparatus of claim 19, wherein the codebook is generated on a carrier-first then slot second basis or on a slot-first then carrier second basis.

21. The apparatus of claim 18, wherein the signaling comprises radio resource control signaling, a physical downlink control channel message, a downlink control information grant associated with the one or more downlink messages, or a combination thereof.

22. The apparatus of claim 18, wherein the processor is configured to cause the apparatus to:

transmit, to the UE, second signaling that indicates whether feedback for each of a plurality of downlink messages scheduled to be received by the UE is to be single-bit feedback or multi-bit feedback, wherein each downlink control information of the second signaling includes a one-bit indicator that indicates whether a second codebook to be generated is to support single-bit feedback or multi-bit feedback;

transmit the plurality of downlink messages to the UE; and receive a second feedback message from the UE responsive to the plurality of downlink messages, the second feedback message reporting the feedback pertaining to each downlink message of the plurality of downlink messages based at least in part on the second codebook, the second codebook supporting inclusion of both single-bit feedback and multi-bit feedback based at least in part on the signaling.

23. A method of wireless communication performed by a user equipment (UE), comprising:

receiving signaling that indicates whether feedback for each of one or more downlink messages scheduled to be received at the UE is to be single-bit feedback or multi-bit feedback;

monitoring for the one or more downlink messages;

generating, based at least in part on the monitoring for the one or more downlink messages, a codebook for reporting the feedback pertaining to each downlink message, the codebook supporting inclusion of both single-bit feedback and multi-bit feedback based at least in part on the signaling; and transmitting a feedback message that is based at least in part on the codebook wherein:

first multi-bit feedback comprises one or more sets of multiple dummy bits in the codebook, and each set of multiple dummy bits corresponds to a potential downlink message;

the codebook includes a first subsubcodebook concatenated with a second subsubcodebook;

the codebook supports inclusion of single-bit feedback or multi-bit feedback based at least in part on an identifier associated with a first physical downlink control channel message scheduling a first downlink message of the one or more downlink messages; or the codebook supports inclusion of single-bit feedback or multi-bit feedback based at least in part on a format of a second physical downlink control channel message scheduling a second downlink message of the one or more downlink messages.

24. The method of claim 23, wherein the signaling indicates whether the feedback is to be single-bit feedback or multi-bit feedback on a per-component carrier basis.

25. The method of claim 24, wherein the UE generates the codebook on a carrier-first then slot-second basis or on a slot-first then carrier-second basis.

26. The method of claim 24, wherein:

the first multi-bit feedback comprises the one or more sets of multiple dummy bits in the codebook.

27. The method of claim 23, wherein the codebook includes the first subsubcodebook concatenated with the second subsubcodebook.

28. The method of claim 27, wherein:

the first subsubcodebook is associated with a first subset of the one or more downlink messages whose feedback is indicated as being single-bit feedback; and the second subsubcodebook is associated with a second subset of the one or more downlink messages whose feedback is indicated as being multi-bit feedback.

29. The method of claim 27, further comprising:

generating, for each monitoring occasion associated with the one or more downlink messages, the first subsubcodebook that supports inclusion of single-bit feedback; and generating, for each monitoring occasion associated with the one or more downlink messages, the second subsubcodebook that supports inclusion of multi-bit feedback.

30. The method of claim 27, wherein the first subsubcodebook is based at least in part on a first control resource set, and wherein the first subsubcodebook supports inclusion of single-bit feedback for a first subset of downlink messages of the one or more downlink messages; and wherein the second subsubcodebook is based at least in part on a second control resource set, and wherein the second subsubcodebook supports inclusion of multi-bit feedback for a second subset of downlink messages of the one or more downlink messages.

31. The method of claim 27, wherein the first subsubcodebook is based at least in part on a first downlink assignment indicator (DAI) pair associated with a first component carrier, wherein the first subsubcodebook is associated with a first subset of the one or more downlink messages, and wherein the first subsubcodebook supports inclusion of single-bit feedback; and wherein the second subsubcodebook is based at least in part on a second DAI pair associated with a second component carrier, wherein the second subsubcodebook is associated with a second subset of the one or more downlink messages, and wherein the second subsubcodebook supports inclusion of multi-bit feedback.

32. The method of claim 23, further comprising:

receiving second signaling that indicates whether feedback for each downlink message of a plurality of downlink messages scheduled to be received at the apparatus is to be single-bit feedback or multi-bit feedback;

determining, based at least in part on the second signaling, that at least one component carrier of a set of component carriers configured for the plurality of downlink messages uses multi-bit feedback;

generating a second codebook using multi-bit feedback for each component carrier in the set of component carriers based at least in part on the at least one component carrier using multi-bit feedback; and transmitting a second feedback message that is based at least in part on the second codebook.

33. The method of claim 23, wherein the codebook supports inclusion of single-bit feedback or multi-bit feedback based at least in part on the identifier associated with the first physical downlink control channel message scheduling the first downlink message of the one or more downlink messages.

34. The method of claim 33, wherein generating the codebook comprises:

generating the codebook to support single-bit feedback based at least in part on a first value of the identifier and to support multi-bit feedback based at least in part on a second value of the identifier.

35. The method of claim 33, wherein the identifier is a control resource set identifier.

36. The method of claim 35, wherein the control resource set identifier is a first control resource set identifier or a second control resource set identifier, and wherein generating the codebook comprises:

generating the codebook to support single-bit feedback based at least in part on the first control resource set identifier; or generating the codebook to support multi-bit feedback based at least in part on the second control resource set identifier.

37. The method of claim 23, wherein the codebook supports inclusion of single-bit feedback or multi-bit feedback based at least in part on the format of the second physical downlink control channel message scheduling the second downlink message of the one or more downlink messages.

38. The method of claim 37, wherein the format is a first format or a second format, and wherein generating the codebook comprises:

generating the codebook to support single-bit feedback based at least in part on the first format of the second physical downlink control channel message; or generating the codebook to support multi-bit feedback based at least in part on the second format of the second physical downlink control channel message.

39. The method of claim 23, further comprising:

receiving second signaling that indicates whether feedback for each downlink message of a plurality of downlink messages scheduled to be received at the apparatus is to be single-bit feedback or multi-bit feedback;

determining, for each monitoring occasion associated with the plurality of downlink messages, whether the feedback is to be single-bit feedback or multi-bit feedback based at least in part on a single bit indicated in a downlink control information scheduling the respective monitoring occasion;

generating, based at least in part on the monitoring for the plurality of downlink messages, a second codebook for reporting the feedback pertaining to each downlink message of the plurality of downlink messages; and transmitting a second feedback message that is based at least in part on the second codebook.

40. A method of wireless communication performed by a base station, comprising:

transmitting, to a user equipment (UE), signaling that indicates whether feedback for each of one or more downlink messages scheduled to be received by the UE is to be single-bit feedback or multi-bit feedback;

transmitting the one or more downlink messages to the UE; and receiving a feedback message from the UE responsive to the one or more downlink messages, the feedback message reporting the feedback pertaining to each downlink message based at least in part on a codebook, the codebook supporting inclusion of both single-bit feedback and multi-bit feedback based at least in part on the signaling, wherein first multi-bit feedback comprises one or more sets of multiple dummy bits in the codebook, and wherein each set of multiple dummy bits corresponds to a potential downlink message;

wherein transmitting the signaling comprises transmitting the signaling in different control resource sets, wherein a first control resource set of the different control resource sets is indicative that a first subsubcodebook is to be generated that supports inclusion of single-bit feedback for a first subset of downlink messages associated with the signaling that is transmitted in the first control resource set, wherein a second control resource set of the different control resource sets is indicative that a second subsubcodebook is to be generated that supports inclusion of multi-bit feedback for a second subset of downlink messages associated with the signaling that is transmitted in the second control resource set, and wherein the one or more downlink messages include the first subset of downlink messages and the second subset of downlink messages; or wherein transmitting the signaling comprises transmitting the signaling using a first format or a second format of a physical downlink control channel message scheduling a first downlink message of the one or more downlink messages, and wherein the codebook supports single-bit feedback based at least in part on the first format of the first physical downlink control channel message and supports multi-bit feedback based at least in part on the second format of the first physical downlink control channel message.

41. The method of claim 40, wherein the signaling indicates whether the feedback is either single-bit feedback or multi-bit feedback on a per-component carrier basis.

42. The method of claim 41, wherein the codebook is generated on a carrier-first then slot second basis or on a slot-first then carrier second basis.

43. The method of claim 40, wherein the signaling comprises radio resource control signaling, a physical downlink control channel message, a downlink control information grant associated with the one or more downlink messages, or a combination thereof.

44. The method of claim 40, further comprising:

transmitting, to the UE, second signaling that indicates whether feedback for each of a plurality of downlink messages scheduled to be received by the UE is to be single-bit feedback or multi-bit feedback, wherein each downlink control information of the second signaling includes a one-bit indicator that indicates whether a second codebook to be generated is to support single-bit feedback or multi-bit feedback;

transmitting the plurality of downlink messages to the UE; and receiving a second feedback message from the UE responsive to the plurality of downlink messages, the second feedback message reporting the feedback pertaining to each downlink message of the plurality of downlink messages based at least in part on the second codebook, the second codebook supporting inclusion of both single-bit feedback and multi-bit feedback based at least in part on the signaling.

* * * * *